US008473895B2

(12) United States Patent
Jackson et al.

(10) Patent No.: US 8,473,895 B2
(45) Date of Patent: Jun. 25, 2013

(54) PROVIDING DIVERSE SOLUTIONS USING DESIGN SPACE EXPLORATION

(75) Inventors: Ethan K. Jackson, Seattle, WA (US); Wolfram Schulte, Bellevue, WA (US); Nikolaj S. Bjorner, Woodinville, WA (US); Eunsuk Kang, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 330 days.

(21) Appl. No.: 12/795,669

(22) Filed: Jun. 8, 2010

(65) Prior Publication Data

US 2011/0302550 A1 Dec. 8, 2011

(51) Int. Cl.
*G06F 9/44* (2006.01)
(52) U.S. Cl.
USPC ............ 717/104; 717/106; 717/109; 717/114
(58) Field of Classification Search
None
See application file for complete search history.

(56) References Cited

U.S. PATENT DOCUMENTS

| | | | |
|---|---|---|---|
| 5,544,067 A | 8/1996 | Rostoker et al. | |
| 6,771,293 B1 | 8/2004 | Josephson et al. | |
| 7,334,214 B1 * | 2/2008 | Baisley | 717/104 |
| 7,500,220 B1 * | 3/2009 | Feng et al. | 717/106 |
| 7,533,365 B1 * | 5/2009 | Hogstrom et al. | 717/105 |
| 7,610,249 B2 | 10/2009 | Afeyan et al. | |
| 8,010,938 B2 * | 8/2011 | Elaasar | 717/104 |
| 8,266,585 B2 * | 9/2012 | Funt et al. | 717/109 |
| 8,321,833 B2 * | 11/2012 | Langworthy et al. | 717/106 |
| 8,365,138 B2 * | 1/2013 | Iborra et al. | 717/104 |
| 2004/0015833 A1 | 1/2004 | Dellarocas et al. | |
| 2005/0262462 A1 | 11/2005 | Janakiraman et al. | |
| 2007/0174812 A1 * | 7/2007 | Yang | 717/114 |
| 2007/0294196 A1 * | 12/2007 | Musuvathi et al. | 706/19 |
| 2009/0132995 A1 * | 5/2009 | Iborra et al. | 717/106 |
| 2009/0164469 A1 * | 6/2009 | Becker et al. | 707/9 |
| 2009/0234801 A1 * | 9/2009 | Moor et al. | 707/2 |

OTHER PUBLICATIONS

A. Hamie, Translating the Object Constraint Language into the Java Modelling Language, Mar. 2004, 5 pages, <http://delivery.acm.org/10.1145/970000/968206/p1531-hamie.pdf>.*
Schwenk et al., Continuous space language models for statistical machine translation, Jul. 2006, 8 pages, <http://delivery.acm.org/10.1145/1280000/1273166/p723-schwenk.pdf>.*
Sarikaya et al., Tied-mixture language modeling in continuous space, May 2009, 9 pages, <http://delivery.acm.org/10.1145/1630000/1620821/p459-sarikaya.pdf>.*

(Continued)

*Primary Examiner* — Thuy Dao

(57) ABSTRACT

A design space exploration (DSE) system automatically discovers viable solutions within a design space. The DSE system operates by creating or receiving a design specification that is described using a design language. The design specification contains a collection of constraints that an acceptable architecture is expected to satisfy. The DSE system then symbolically executes the design specification to provide a logical formula. The DSE system then interacts with a theorem prover module to identify one or more solutions to the formula. Finally, the DSE system converts the solutions into a user-interpretable form (e.g., expressed in the format of the modeling language) for viewing by a user. Each solution pertains to an architecture that satisfies the collection of constraints. The DSE system ensures that the solutions are diverse by disfavoring any solution that is deemed similar to any solution that has been previously encountered.

20 Claims, 15 Drawing Sheets

OTHER PUBLICATIONS

Taghavi, et al., "Visualization of Computer Architecture Simulation Data for System-Level Design Space Exploration," retrieved at <<http://www.springerlink.com/content/u3668276546u2704/>>, Proceedings of the 9th International Workshop on Embedded Computer Systems: Architectures, Modeling, and Simulation, Lecture Notes in Computer Science, vol. 5657, 2009, abstract only, 1 page.

Sen, et al., "Domain-Specific Model Editors with Model Completion," retrieved at <<http://www.springerlink.com/content/c396k84uk06389h3/>>, Models in Software Engineering: Workshops and Symposia at MoDELS 2007, Lecture Notes in Computer Science, vol. 5002, 2008, abstract only, 1 page.

Josephson, et al., "An Architecture for Exploring Large Design Spaces," retrieved at <<http://www.cse.ohio-state.edu/~chandra/aaai-98.pdf>>, Proceedings of the National Conference on Artificial intelligence, 1998, pp. 143-150.

Peixoto, et al., "Algorithm and Architecture-level Design Space Exploration Using Hierarchical Data Flows," retrieved at <<http://www.computer.org/portal/web/csdl/doi/10.1109/ASAP.1997.606833>>, Proceedings of the IEEE International Conference on Application-Specific Systems, Architectures and Processors, Jul. 1997, abstract only, 1 page.

Karsai, et al., "Model-Integrated Development of Embedded Software," retrieved at <<http://citeseerx.ist.psu.edu/viewdoc/download?doi=10.1.1.128.1450&rep=rep1&type=pdf>>, Proceedings of the IEEE, vol. 91, No. 1, 2003, pp. 145-164.

Harel, et al., "Modeling Reactive Systems with Statecharts: The Statemate Approach," retrieved at <<http://www.wisdom.weizmann.ac.il/~dharel/STM.Book/chapter1.pdf>>, McGraw-Hill, 1998, Chapter 1, 32 pages.

Henzinger, Thomas A., "The Theory of Hybrid Automata," retrieved at <<http://mtc.epfl.ch/~tah/Publications/the_theory_of_hybrid_automata.pdf>>, Proceedings of the 11th Annual IEEE Symposium on Logic in Computer Science, Jul. 1996, 30 pages.

Sztipanovits, et al., "Model-Integrated Computing," retrieved at <<http://ieeexplore.ieee.org/stamp/stamp.jsp?tp=&arnumber=585163&userType=inst>>, IEEE Computer, vol. 30, No. 4, Apr. 1997, pp. 110-111.

Clark, et al., "Engineering Modeling Languages: A Precise Metamodeling Approach," retrieved at <<http://www.cs.york.ac.uk/puml/mmf/langeng.ps>>, Proceedings of the 5th International Conference on Fundamental Approaches to Software Engineering, Apr. 2002, 26 pages Evans, et al., "Developing UML as a Formal Modeling Notation," retrieved at <<http://citeseerx.ist.psu.edu/viewdoc/download?doi=10.1.1.10.3204&rep=rep1&type=pdf>>, Lecture Notes in Computer Science, vol. 1357, 1997, 12 pages.

Levendovszky, et al., "Model Reuse with Metamodel Based Transformations," retrieved at <<http://www.math.u-szeged.hu/~mmaroti/pdf/2002%20Model%20reuse%20with%20metamodel%20based%20transformations.pdf>>, Proceedings of the 7th International Conference on Software Reuse: Methods, Techniques, and Tools, 2002, Lecture Notes in Computer Science, vol. 2319, 14 pages.

Bostic, et al., "Usage Scenarios for an Automated Model Compiler," retrieved at <<http://dogbert.mse.cs.cmu.edu/synergy/ClientDocs/Usage%20Scenario%20Presentation.pdf>>, EMSOFT presentation, Oct. 2001, 17 pages.

Clark, et al., "The MMF Approach to Engineering Object-Oriented Design Languages," retrieved at <<http://www.cs.york.ac.uk/puml/mmf/clarkpatterns.pdf>>, Workshop on Language Descriptions, Tools and Applications (LTDA 2001), 2001, 22 pages.

Neema, Sandeep, "Simulink and Stateflow Data Model," retrieved at <<http://www.isis.vanderbilt.edu/sites/default/files/Neema_S_3_0_2001_Analysis_o.pdf>>, Vanderbilt University Technical Report, No. ISIS-01-204, 2001, 28 pages.

Nordstrom, et al., "Metamodeling—Rapid Design and Evolution of Domain-Specific Modeling Environments," retrieved at <<http://ieeexplore.ieee.org/stamp/stamp.jsp?arnumber=00755863>>, Proceedings of the IEEE ECBS'99, 1999, 7 pages.

"Object Constraint Language Specification", Version 2.0, retrieved at <<http://www.omg.org/cgi-bin/doc?formal/06-05-01.pdf>>, Object Management Group, May 2006, 232 pages.

Neema, Sandeep., "Design Space Representation and Management for Embedded Systems Synthesis," retrieved at <<http://www.isis.vanderbilt.edu/sites/default/files/Neema_S_2_0_2001_Design_Spa.pdf>>, Vanderbilt University Technical Report, No. ISIS-01-203, 2001, 43 pages.

Bryant, Rankdal E., "Symbolic Manipulation with Ordered Binary Decision Diagrams," retrieved at <<http://ptolemy.eecs.berkeley.edu/~johnr/archives/tycho/pdf/uml-semantics.pdf>>, CMU Technical Report CMI-CS-92-160, 1992, 34 pages.

"UML Semantics", version 1.1, retrieved at <<http://ptolemy.eecs.berkeley.edu/~johnr/archives/tycho/pdf/uml-semantics.pdf>>, Sep. 1, 1997, 168 pages.

"The Mozart Programming System," retrieved at <<http://www.mozart-oz.org/>>, retrieved on Feb. 19, 2010, 1 page.

Ledeczi, et al., "Overview of the Model-based Integrated Simulation Framework," retrieved at <<http://www.isis.vanderbilt.edu/sites/default/files/Ledeczi_A_1_30_2001_0verview_o.pdf>>, Vanderbilt University Technical Report, No. ISIS-01-201, 2001, pp. 13 pages.

Lee, et al., "A Framework for Comparing Models of Computations," retrieved at <<http://citeseerx.ist.psu.edu/viewdoc/download?doi=10.1.1.125.4420&rep=rep1&type=pdf>>, IEEE Transactions on Computer-Aided Design of Integrated Circuits and Systems, vol. 17, No. 12, Dec. 1998, pp. 1217-1229.

Burch, et al., "Modeling Techniques in Design-by-Refinement Methodologies," retrieved at <<http://disi.unitn.it/~roby/pdfs/BurchPasseroneASV02FDL.pdf>>, Proceedings of the Sixth Biennial World Conference on Integrated Design and Process Technology, 2002, 12 pages.

Carloni, et al., "Platform-Based Design for Embedded Systems," retrieved at <<http://citeseerx.ist.psu.edu/viewdoc/download?doi=10.1.1.66.7365&rep=rep1&type=pdf>>, The Embedded Systems Handbook, CRC Press, 2005, 36 pages.

Lee, et al., "Actor-Oriented Design of Hardware and Software Systems," retrieved at <<http://ptolemy.eecs.berkeley.edu/papers/02/actorOrientedDesign/newFinal.pdf>>, Journal of Circuits, Systems, and Computers, 2003, 29 pages.

Balarin, et al., "Metropolis: An Integrated Electronic System Design Environment," Retrieved at <<http://embedded.eecs.berkeley.edu/metropolis/metropolis_icm0403.pdf>>, IEEE Computer, vol. 36, No. 4, Apr. 2003, pp. 45-52.

Batory, Don., "Feature Models, Grammars, and Propositional Formulas," retrieved at <<http://www.pdfdownload.org/pdf2html/pdf2html.php?url=http%3A%2F%2Fwww%2Ecs%2Eutexas%2Eedu%2Ftftp%2Fpub%2Ftechreports%2Ftr05%2D14%2Epdf&images=no>>, University of Texas, Department of Computer Sciences, Technical Report 05-14, Mar. 2005, 13 pages.

Benavides, et al., "Automated Reasoning on Feature Models," version retrieved at <<http://citeseerx.ist.psu.edu/viewdoc/download?doi=10.1.1.60.6249&rep=rep1&type=pdf>>, Advanced Information Systems Engineering 17th International Conference, CAiSE 2005, 2005, Lecture Notes in Computer Science, vol. 3520, 14 pages.

Bryant, Randal E., "Graph-Based Algorithms for Boolean Function Manipulation," retrieved at <<http://ieeexplore.ieee.org/stamp/stamp.jsp?tp=&arnumber=1676819>>, IEEE Transactions on Computers, vol. 35, No. 8, Aug. 1986, pp. 677-691.

Clarke, et al., "Model Checking," retrieved at <<www.cs.cmu.edu/~modelcheck/ed-papers/mc.pdf, date unknown, 46 pages.

Czarnecki, et al., "Verifying Feature-Based Model Templates Against Well-Formedness OCL Constraints," retrieved at <<portal.acm.org/citation.cfm?id=1173738>>, Proceedings of the 5th international conference on Generative Programming and Component Engineering, Oct. 2006, 10 pages.

De Lara, et al., "ATOM3: A Tool for Multi-Formalism and Meta-Modelling," retrieved at <<http://www.springerlink.com/content/wr3dhxug8jmlgxyh/>>, Fundamental Approaches to Software Engineering, Lecture Notes in Computer Science, vol. 2306, 2002, pp. 174-188.

De Moura, et al., "An Efficient SMT Solver," retrieved at <<http://citeseerx.ist.psu.edu/viewdoc/ download;jsessionid=449FFE9CFD074161949631F585E106D0?doi=10.1.1.86.5840&rep=rep1&type=pdf>>, Tools and Algorithms for the Construcrtion and Analysis of Systems, vol. 4963/2008, 2008, 4 pages.

Eles, et al., "System Level Hardware/Software Partitioning Based on Simulated Annealing and Tabu Search," retrieved at <<http://www.springerlink.com/content/n0m725q46126v741/>>, Design Automation for Embedded Systems, vol. 2, No. 1, Jan. 1997, pp. 5-32.

Glover, et al., "Tabu Search," retrieved at <<www.dei.unipd.it/~fisch/ricop/tabu_search_glover_laguna.pdf>>, date unknown, 18 pages.

Gries, Matthias, "Methods for Evaluating and Covering the Design Space During Early Design Development" retrieved at <<http://www.mgries.net/publications/ucb-erl_m03-32_DSE_survey.pdf>>, Integration, the VLSI Journal, vol. 38, No. 2, Dec. 2004, 53 pages.

Hu, et al., "A Framework for User Assisted Design Space Exploration," retrieved at <<http://delivery.acm.org/>>, Proceedings of the 36th Annual ACM/IEEE Design Automation Conference, Jun. 1999, 6 pages.

Jackson, et al., "Specifying and Composing Non-Functional Requirements in Model-Based Development," retrieved at <<http://www.springerlink.com/content/04347788233h2236/>>, Proceedings of the 8th International Conference on Software Composition, Lecture Notes in Computer Science, vol. 5634, 2009, pp. 72-89.

Jackson, et al., "Formalizing the Structural Semantics of Domain-Specific Modeling Languages," retrieved at <<http://www.springerlink.com/content/4126kx7104734762/>>, in Software and Systems Modeling, vol. 8, No. 4, Springer Berlin, Sep. 2009, pp. 452-478.

Kakita, et al., "Functional Model Exploration for Multimedia Applications Via Algebraic Operators," retrieved at <<http://ieeexplore.ieee.org/stamp/stamp.jsp?tp=&arnumber=1640240>>, Proceedings of the Sixth International Conference on Application of Concurrency to System Design, Jun. 2006, 10 pages.

Kanajan, et al., "Exploring Trade-Off's Between Centralized Versus Decentralized Automotive Architectures Using a Virtual Integration Environment," retrieved at <<http://delivery.acm.org>>, Proceedings of the Conference on Design, Automation and Test in Europe, Mar. 2006, pp. 548-553.

La Valle, et al., "Randomized Kinodynamic Planning," retrieved at <<http://www.eecs.harvard.edu/~avi/CS281r/F06/Papers/lavalle-kuffner-rrt-journal>>, The International Journal of Robotics Research, vol. 20, No. 5, May 2001, pp. 378-400.

Cengarle, et al., "On the Expressive Power of Pure OCL," retrieved at <<http://www.pst.informatik.uni-muenchen.de/~cengarle/ocl.ps>>, Universitat Munchen, 2001, 24 pages.

Manolios, et al., "Automating Component-Based System Assembly," retrieved at <<http://delivery.acm.org>>, International Symposium on Softwar1e Testing and Analysis, Proceedings of the 2007 International Symposium on Software Testing and Analysis, Jul. 2007, pp. 61-71.

Muller, et al., "Weaving Executability into Object-Oriented Metalanguages," retrieved at <<www.irisa.fr/triskell/publis/2005/Muller05a.pdf>>, The 8th International Conference on Model Driven Engineering Languages and Systems, Oct. 2005, 15 pages.

Myers, Glenford J., "The Art of Software Testing," retrieved at <<http://delivery.acm.org/10.1145/1120000/1113478/p23a-ives.pdf?key1=1113478&key2=5364856621&coll=ACM&dl=ACM&CFID=78590106&CFTOKEN=16017753>>, book review, Data Base, Summer, 1979, 1 page.

Neema, et al., "Constraint-Based Design-Space Exploration and Model Synthesis," retrieved at <<http://www.springerlink.com/content/h5c60mea3vx9g2q0/>>, Proceedings of EMSOFT'03, vol. 2855 of LNCS, 2003, pp. 290-305.

"Meta Object Facility (MOF) Core Specification," retrieved at <<http://www.omg.org/spec/MOF/2.0/PDF/>>, Version 2.0, Object Management Group, Jan. 2006, 88 pages.

Ruscio, et al., "Extending AMMA for Supporting Dynamic Semantics Specifications of DSLs," retrieved at <<hal.archives-ouvertes.fr/docs/00/06/61/21/PDF/rr0602.pdf, Laboratoire D'Informatique de Nantes-Atlantique, No. 06.02, Apr. 2006, 20 pages.

Laarhoven, et al., "Simulated Annealing: Theory and Applications," retrieved at <<http://www.springerlink.com/content/t1n71m85j33556m4/>>, book review, Acta Applicandae Mathematicae, 12, 1988, pp. 108-111.

White, et al., "Filtered Cartesian Flattening: An Approximation Technique for Optimally Selecting Features While Adhering to Resource Constraints," retrieved at <<http://www.isa.us.es/aspI08/?download=W5_P05_White_Filtered_Cartesian_Flattening.pdf>>, Journal of Systems and Software, vol. 82, No. 8, Aug. 2009, 8 pages.

Wiangtong, et al., "Comparing Three Heuristic Search Methods for Functional Partitioning in Hardware-Software Codesign," retrieved at <<http://www.springerlink.com/content/61cr2wg72cubbegg/>>, Design Automation for Embedded Systems, vol. 6, No. 4, Jul. 2002, pp. 425-449.

Mandel, et al., "On the Expressive Power of OCL," version retrieved at <<www.pst.informatik.uni-muenchen.de/~cengarle/ocl.ps>>, Proceedings of the World Congress on Formal Methods in the Development of Computing Systems, vol. I, Lecture Notes in Computer Science, vol. 1708, 1999, 21 pages.

Glover, et al., Tabu Search, Kluwer Academic Publishers, Norwell, MA, USA, 1997, ACM book review only, retrieved at <<http://portal.acm.org/citation.cfm?id=549765>>, retrieved on Jun. 3, 2010, 2 pages.

Clarke, et al., Model Checking, MIT Press, 2000, book description, retrieved at <<http://mitpress.mit.edu/catalog/item/default.asp?ttype=2&tid=3730, retrieved on Jun. 3, 2010, 1 page.

Shlyakhter, liya, "Generating Effective Symmetry-Breaking Predicates for Search Problems," retrieved at <<people.csail.mit.edu/ilya_shl/partsymmdam.ps>>, Discrete Applied Mathematics, vol. 155, Issue 12, 2007, 20 pages.

Polya, et al., Combinatorial Enumeration of 2+Groups, Graphs, and Chemical Compounds, Springer-Verlag, New York, 1987, Amazon.com abstract only, retrieved at <<http://www.amazon.com, 5 pages.

Bland, et al., "Tabu Search and Design Optimization," Computer-Aided Design, vol. 23, Issue 3, Apr. 1991, retrieved at <<http://www.sciencedirect.com/science>>, abstract only, 2 pages.

Jackson, et al., "The Power of Rich Syntax for Model-Based Development," retrieved at <<http://research.microsoft.com/pubs/77374/ThePowerOfRichSyntax(Draft2008).pdf>>, Microsoft Research Technical Report, 2008, Microsoft Corporation, Redmond, WA, 20 pages.

Jackson, et al., "Towards a Formal Foundation for Domain-Specific Modeling Languages," retrieved from <<http://acm.org>>, Proceedings of the 6th ACM & IEEE International Conference on Embedded Software, 2006, pp. 53-62.

Ethan Jackson publication home page publication listing, retrieved at <<http://research.microsoft.com/en-us/um/people/ejackson/publications.aspx>>, retrieved on Jun. 3, 2010, Microsoft Corporation, Redmond, WA, 2 pages.

Sangiovanni-Vincentelli, Alberto, "Defining Platform-Based Design," retrieved at <<http://www.eetimes.com/news/design/showArticle.jhtml;jsessionid=PULGEN2EUE2ZPQE1GHPSKH4ATMY32JVN?articleID=16504380&printable=true&printable=true>>, EE Times, Feb. 2002, 11 pages.

"A Generic Modeling Environment: GME 5 User's Manual"; Version 5; retrieved at http://www.isis.vanderbilt.edu/sites/default/files/GMEUMan.pdf; Institute for Software Integrated Systems; Vanderbilt University; retrieved on Jun. 3, 2010; 224 pages.

* cited by examiner

PROVIDING DIVERSE SOLUTIONS USING DESIGN SPACE EXPLORATION

BACKGROUND

A user may rely on design space exploration (DSE) tools to help find a viable solution to a design problem. In operation, the user identifies constraints which have a bearing on the problem. The user can then use the DSE tool to help automate certain aspects of design analysis. However, current DSE tools provide only limited assistance in this regard. For example, current DSE tools may still require the user to perform a substantial amount of manual analysis in the design process, e.g., by essentially manually guiding the DSE tool in its exploration of a design space. Design problems are extremely complex; hence, the assistance provided by such DSE tools may still result in a design experience that is regarded as tedious, confusing, and imprecise.

SUMMARY

A design space exploration (DSE) system is described for exploring a design space to find acceptable solutions to a design problem. In one implementation, the DSE system begins by using a modeling language to formulate a design specification, or to receive an already formulated design specification. The design specification describes a collection of constraints that an acceptable architecture is expected to satisfy. The DSE system then symbolically executes the design specification to provide a logical formula. The DSE system then interacts with a theorem prover module to iteratively identify one or more diverse solutions to the formula, if at least one solution exists. Finally, the DSE system converts the solutions into a user-interpretable form (e.g., expressed in the format of the modeling language) for viewing by a user. Each solution pertains to an architecture that satisfies the collection of constraints, as originally formulated using the modeling language.

According to one implementation, each architecture corresponds to a software architecture that carries out a plurality of tasks using a plurality of devices, where the plurality of devices are coupled together using a plurality of channels. In this context, the collection of constraints may operate to constrain the ways in which the different elements of the software architecture can be combined together.

According to another illustrative feature, the DSE system finds a solution by first identifying a region of investigation within the design space. The DSE system can identify this region using a random selection technique, e.g., by randomly equating variables in a generator set.

According to another illustrative feature, the DSE system can ensure that the solutions are diverse by disfavoring any solution that is deemed similar to any solution that has been previously encountered (in a previous analysis iteration), as assessed based on at least one similarity consideration. In one implementation, the similarity consideration corresponds to an isomorphism assessment. Two solutions are deemed isomorphic counterparts if they differ in their labeling, but not in topology.

According to another illustrative feature, the DSE system can identify regions of the design space which have proven to yield no solutions. The DSE system can then expedite its discovery of solutions by effectively blocking the investigation of those identified regions of design space.

Generally, the DSE system provides good user experience and provides precise results. For instance, the DSE system provides a user-friendly interface through which a user may express system constraints in a structured manner. Upon instruction, the DSE system can then automatically identify viable and diverse solutions which satisfy the constraints. The user is not asked to perform the burdensome task of guiding the DSE system in performing its exploration of the design space. The user simply receives a list of viable solutions satisfying the complex design constraints which he or she formulated in a high-level modeling language.

The above approach can be manifested in various types of systems, components, methods, computer readable media, data structures, articles of manufacture, and so on.

This Summary is provided to introduce a non-exhaustive selection of concepts and attendant benefits in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an overview of a design space exploration (DSE) system for identifying viable and diverse solutions within a design space. The DSE system includes, inter alia, a specification formulation module, a symbolic execution module, and an exploration module. Section B sets forth additional details of the specification formulation module. Section C sets forth additional details of the symbolic execution module. Section D sets forth additional details of the exploration module. And Section E sets forth illustrative processing functionality that can be used to implement any aspect of the features described in the foregoing sections.

Figure 17:
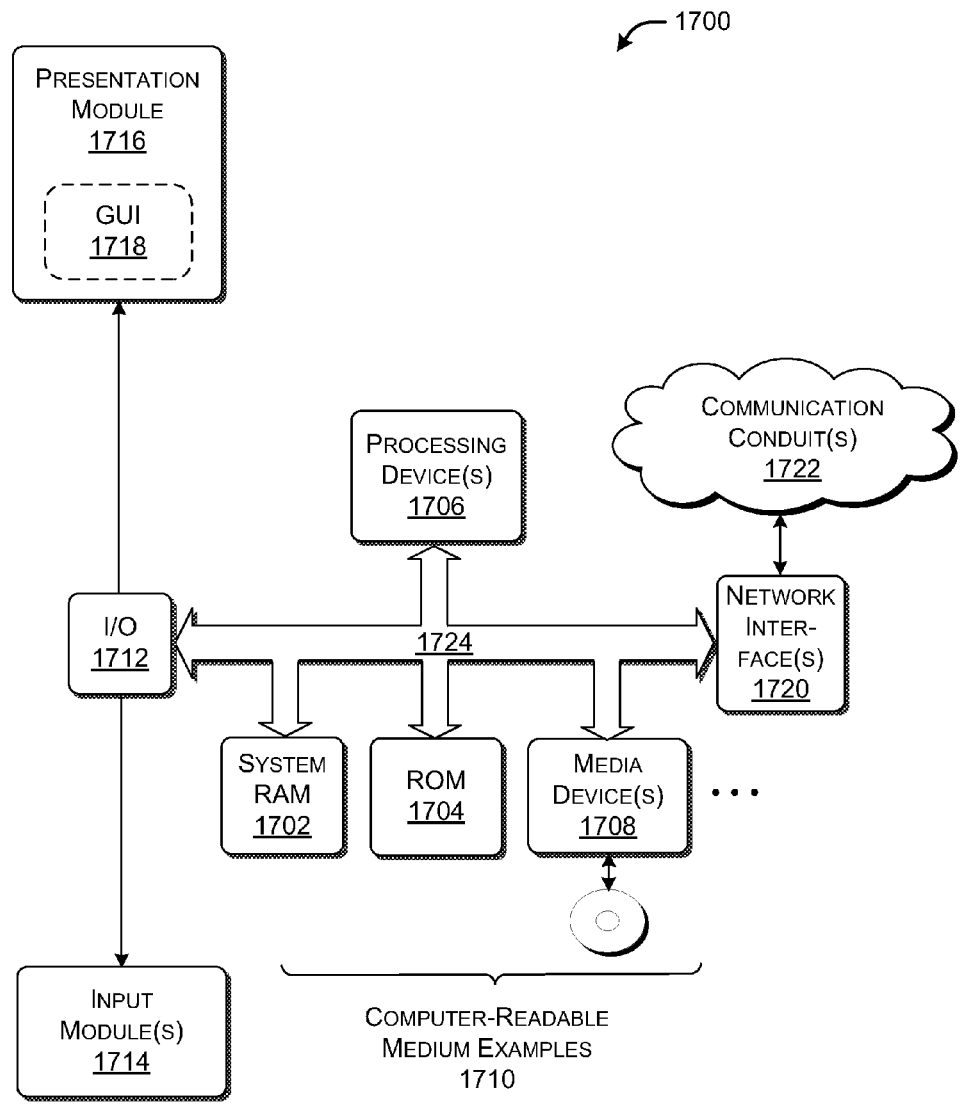
FIG. 17 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 17, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

As to terminology, the phrase "configured to" encompasses any way that any kind of functionality can be constructed to perform an identified operation. The terms "logic" or "logic component" encompass any functionality for performing a task. For instance, each operation illustrated in the flowcharts corresponds to a logic component for performing that operation. When implemented by a computing system (e.g., "electrical processing functionality"), a logic component represents a physical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Overview

A design space exploration (DSE) system operates to generate one or more solutions to any type of design problem. In one case, the user may use the DSE system to design a physical system of any type, such as mechanical system (such as a manufacturing system), a software-driven system, an electrical system (involving discrete electrical hardware components), a biological system, etc., or any combination thereof. In other cases, the user may use the DSE system to solve operational research problems of any type, such as scheduling problems, packing problems, etc.

Further, the user can rely on the DSE system in different analysis contexts. In one case, the user can use the DSE system to generate prototypes for a complex system that is yet to be built. Hence, in this context, the user may opt to use the DSE system at the initial stages of the design process. In another case, the user can use the DSE system in conjunction with other design tools, such as one or more optimization tools. For example, the user can use other design tools to provide a large number of candidate solutions. The user can then apply the DSE system to explore a design space associated with the candidate solutions, thereby refining the analysis provided by the other tools. In another case, the user can use the DSE system to determine a viable manner in which to assemble existing systems and components, or to re-design an existing system in manner. These examples are representative rather than exhaustive; a user can apply the DSE system in many other analysis contexts.

This section begins with an explanation of one type of design problem that the DSE system can address. This explanation will help place the forthcoming description of the DSE system in a concrete (yet representative) context. Namely, consider a software design problem that involves a collection of tasks (T) to be performed by a collection of devices (D). The devices may be coupled together by a collection of communication channels. Each channel has a capacity (cap).

A number of constraints may govern an architecture that is built from these parts. The nature of these constraints may vary for different technical environments and design goals. In one environment, one constraint may specify that conflicting tasks cannot be bound to the same device. A task may conflict with another task for various reasons. For example, two tasks may consume too much memory of a device when they are both running on the same device, and therefore cannot be placed together. Or various scheduling constraints may prevent both tasks from being implemented on the same device, and so on. Another constraint may limit the number of communication channels associated with a device. For example, a particular environment can specify that a device have no more than x input channels and y output channels. Another constraint may specify that the total capacity provided by the input channels equals the total capacity provided by the output channels, and so on. To repeat, this is merely a representative collection of constraints associated with one illustrative environment.

Figure 1:
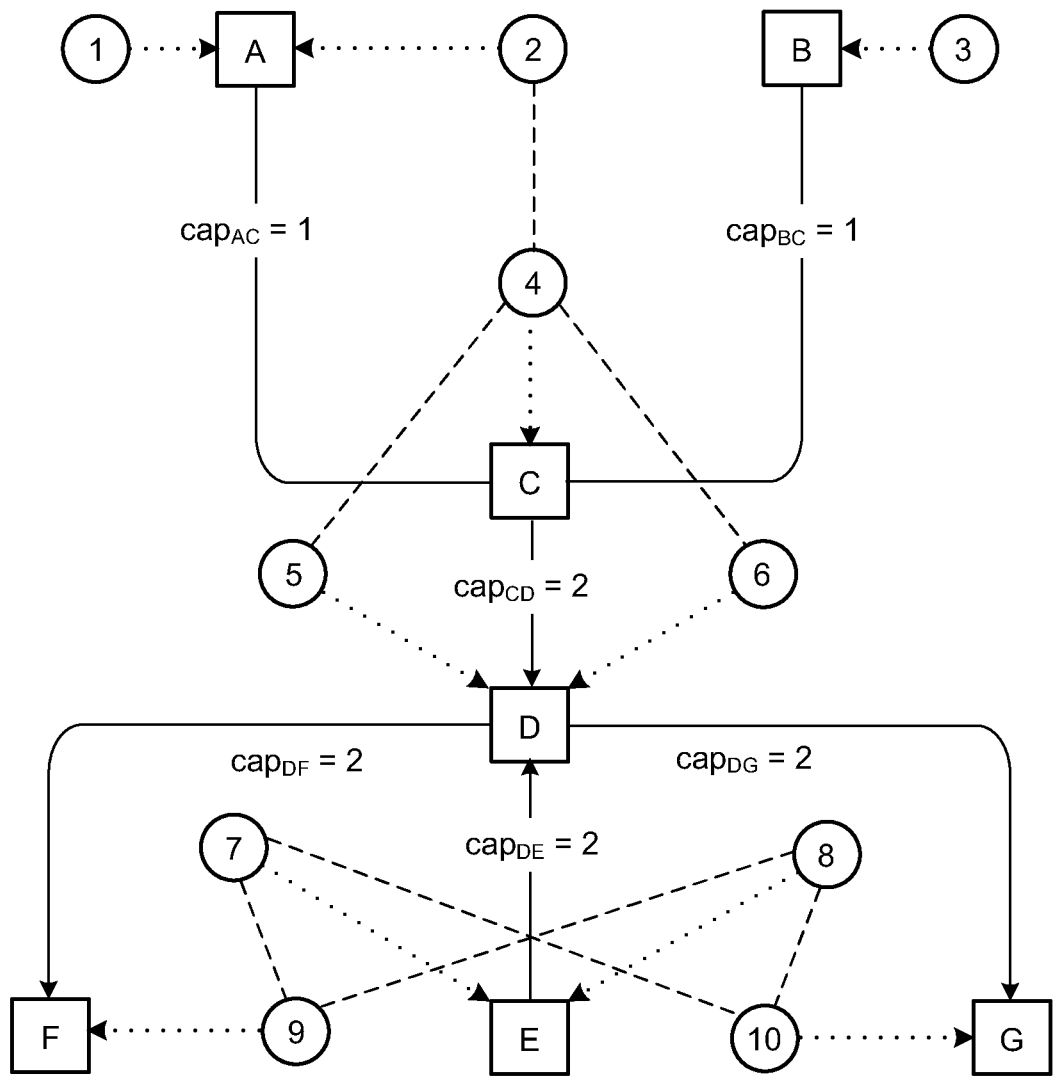
FIG. 1 shows an example of a solution that can be identified by a design space exploration (DSE) system described herein; more generally, this figure is used to introduce one illustrative context in which the DSE system can be used.

The DSE system operates on these constraints to specify one or more solutions (also referred to as a models or architectures) which satisfy the constraints. FIG. 1 shows just one of many possible solutions that satisfies the constraints. The boxes with letter-bearing labels represent devices. The solid lines that connect the devices together represent channels having prescribed capacities. The circles with numeral-bearing labels represent tasks. The dotted lines represent the binding of tasks to components. The dashed lines represent conflicts between different pairs of tasks.

The design problem described above may seem relatively simple, in the sense that constraints can be conceptualized in a straightforward way. However, it actually represents, in part, a computationally difficult graph coloring problem that cannot be effectively solved in a manual manner. This difficulty is compounded in real-world problems that involve more complex constraints and candidate architectures.

Figure 2:
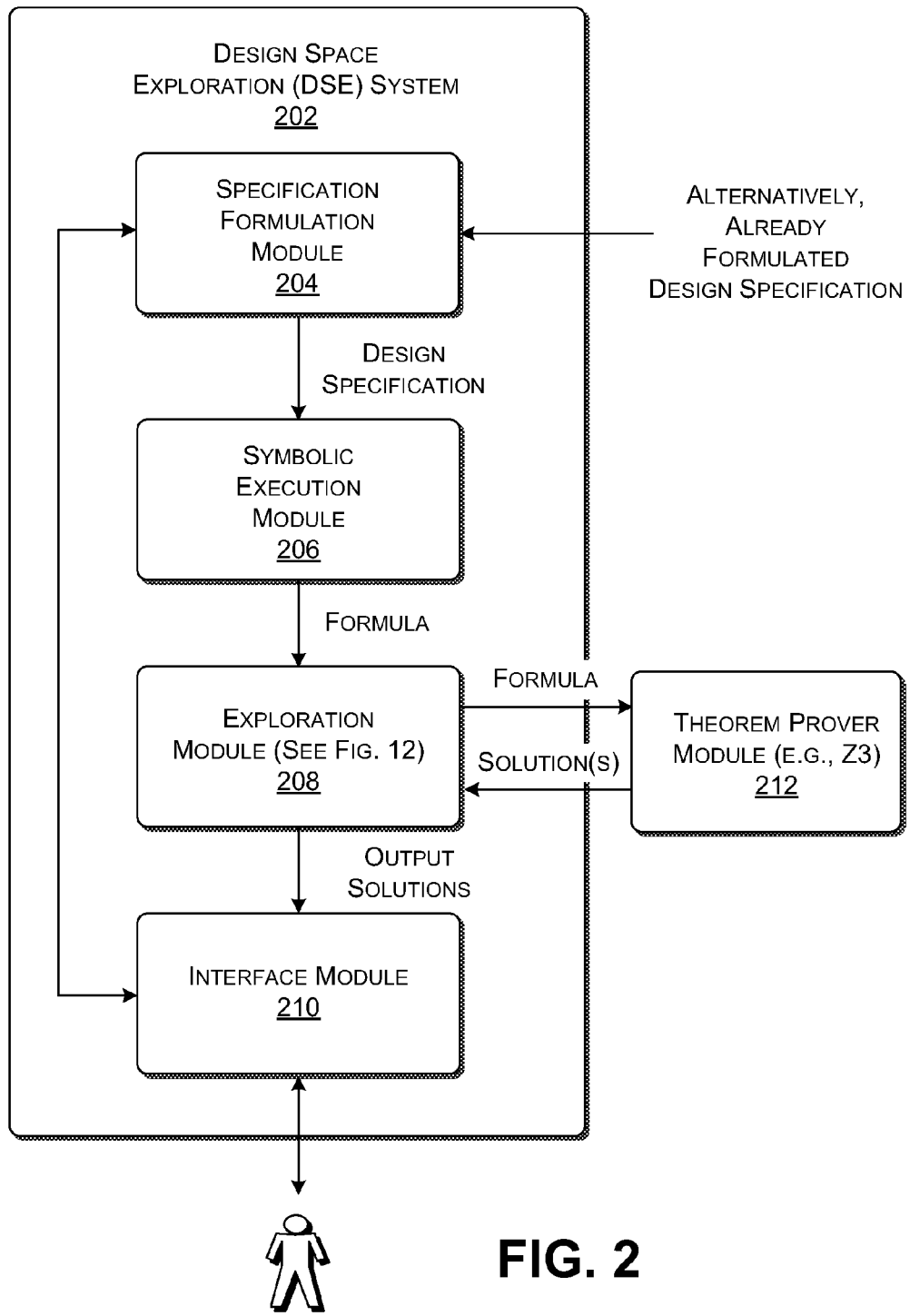
FIG. 2 shows an illustrative overview of the DSE system.

Advancing to FIG. 2, this figure shows a design space exploration (DSE) system 202 for identifying solutions to complex design problems, like the solution shown in FIG. 1. The DSE system 202 includes (or can be conceptualized to include) a collection of component modules, namely: a specification formulation module 204; a symbolic execution module 206; an exploration module 208; and an interface module 210. An overview of these modules follows in this section. Section B provides additional detail regarding the specification formulation module 204. Section C provides additional detail regarding the symbolic execution module 206. And Section D provides additional detail regarding the exploration module 208.

The specification formulation module 204 provides functionality that allows a user to express the constraints that govern a design problem using a modeling language that uses logic programming techniques. Such a modeling language allows a user to declaratively specify the characteristics of a desired solution to thereby create a design specification. In contrast to algorithm-based languages, an execution engine can operate on the modeling language to determine whether the conditions and assertion patterns specified therein logically evaluate to true or false. One illustrative modeling language that can be used to implement the specification formulation module 204 is FORMULA, described, for example in: Ethan Jackson, et al., "Specifying and Composing Non-Functional Requirements in Model-Based Development," *Software Composition*, Vol. 5634, 2009, pp. 72-89; Ethan Jackson, et al., "Formalizing the Structural Semantics of Domain-Specific Modeling Languages," *Software and Systems Modeling*, Vol. 8, No. 4, 2009, pp. 451-478; Ethan Jackson, et al., "The Power of Rich Syntax for Model-Based Development," Microsoft Research Technical Report, 2008, Microsoft Corporation, Redmond, Wash.; and Ethan Jackson et al., "Towards a Formal Foundation for Domain-Specific Modeling Languages," *Proceedings of the 6th ACM & IEEE International Conference on Embedded Software*, 2006, pp. 53-62, etc. Alternatively, the specification formulation module 204 can be used to receive a design specification that has already been produced by any source functionality (internal or external to the DSE system 202) using a suitable modeling language.

The symbolic execution module 206 receives the design specification from the specification formulation module 204. The design specification expresses the constraints associated with the design problem in the format of a modeling language, such as FORMULA. The symbolic execution module 206 operates to convert the design specification to form that is interpretable by a theorem prover module 212. This operation may entail symbolically executing the design specification to expand the design specification into a quantifier-free formula.

The theorem prover module 212 itself may represent a satisfiability modulo theories (SMT) solver module. By way of overview, a SMT solver module attempts to find a solution to a formula within a symbolic domain, essentially solving a combinatorial problem defined by multiple constraints, with reference to a background theory. (A background theory provides information regarding the proper interpretation of information supplied to it in the formula provided by the symbolic execution module 206).

Different types of general-purpose theorem prover modules are available in the field, any of which can be used by the DSE system 202 of FIG. 2. For example, the Z3 theorem prover, provided by Microsoft Corporation of Redmond, Wash., can be used to implement the theorem prover module 212 of FIG. 2. The Z3 theorem prover is described in various publications, including: Leonardo de Moura, et al., "Z3: An Efficient SMT Solver," *Tools and Algorithms for the Construction and Analysis of Systems*, Vol. 4963/2008, Apr. 3, 2008, pp. 337-340. Other theorem prover modules include: Alt-Ergo, Ario, Barcelogic, Beaver, Boolector, CVC, CVC Lite, CVC3, DPT (Intel), ExtSAT, Harvey, HTP, ICS (SRI), Jat, MathSAT, OpenSMT, Sateen, Simplify, Spear, STeP, STP, SVC, Sword, TSAT, UCLID, etc.

The exploration module 208 receives the formula provided by the symbolic execution module 206. It then interacts with the theorem prover module 212 to identify one or more solutions which satisfy the design constraints. As will be described, the exploration module 208 performs this task in iterative fashion. At each iteration, the exploration module 208 returns one or more solutions (if at least one solution exists). The exploration module 208 also takes steps to ensure that the solutions that it finds are diverse with respect to each other. In other words, the exploration module 208 attempts to ensure that the solution that it returns at any particular iteration is not too similar compared to previous returned solutions.

The interface module 210 allows the user to interact with the DSE system 202. For example, the user can use the interface module 210 to generate the design specification, e.g., by interacting with the specification formulation module 204. The user can also use the interface module 210 to review the solutions provided by the exploration module 208. The user can also use the interface module 210 to change various parameters which govern the analysis performed by the DSE system 202, such as bound-related parameters (to be discussed below). Otherwise, in one implementation, the DSE system 202 provides a largely automated approach to finding solutions within a design space. The user creates a design specification in a structured and user-friendly manner, and then instructs the DSE system 202 to find solutions for the design specification. The user may receive a gallery of diverse solutions without having to manually guide the exploration process of the DSE system 102.

Figure 3:
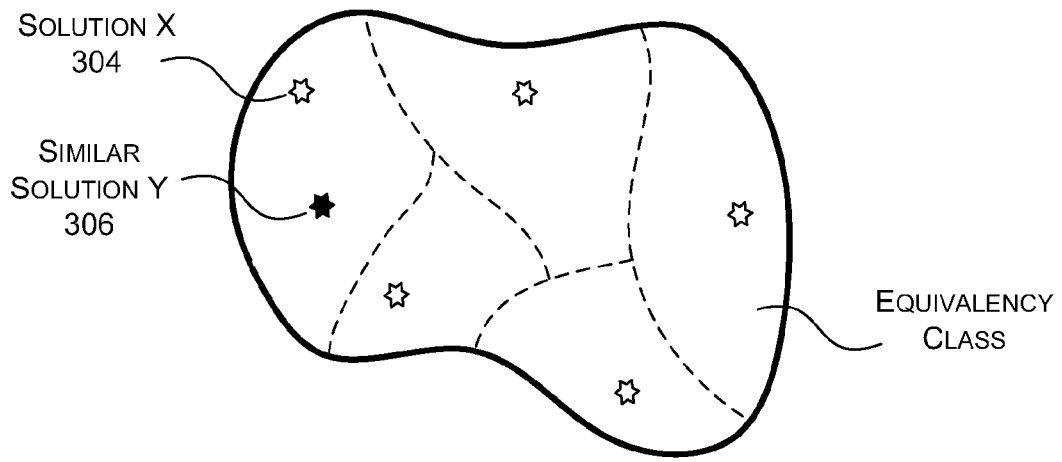
FIG. 3 shows a high-level representation of a portion of a design space.
Figure 4:
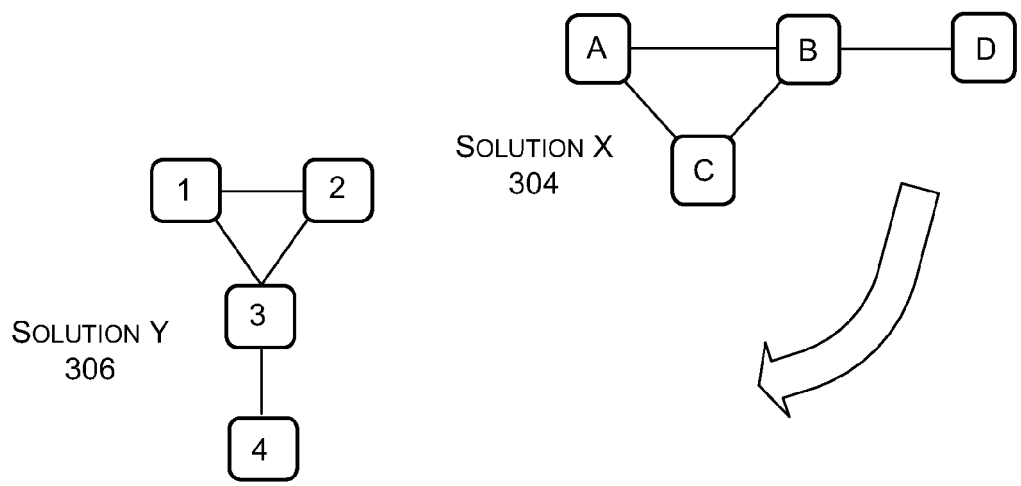
FIG. 4 shows an example of two solutions that are considered non-diverse, based on one definition of similarity.

As noted above, the DSE system 202 operates by finding diverse solutions, meaning solutions that are considered sufficiently different based on any type of similarity consideration. FIGS. 3 and 4 expand on this notion. To begin with, FIG. 3 shows a high-level and simplified representation of a portion of a design space 302. (The two-dimensional graphical depiction of the design space 302 is figurative, not necessarily literal). Generally, a design space 302 represents a collection of design possibilities which can be explored for viable solutions to a design problem. A "location" within the design space 302 can be defined by a set of values which characterize a particular solution.

FIG. 3 also shows that the design space can be partitioned into different sections, referred to as equivalency classes. Each equivalency class describes solutions that are considered as similar based on an identified similarity consideration. In one case, the DSE system 202 operates by finding no more than one solution in each equivalency class. FIG. 3 figuratively represents these diverse solutions as a collection of white stars, such as solution X 304. Solution Y 306 belongs to the same equivalency class as solution X 304. Thus, solution Y 306 is deemed non-diverse with respect to solution X 304. In one implementation, the DSE system 202 will either present solution X 304 or solution Y 306 to the user, but not both. In other implementations, the similarity rules applied by the DSE system 202 can be relaxed, such that it can, in certain instances, generate more than one solution within an equivalency class.

In one approach, the DSE system 202 determines that two solutions are similar if these solutions are isomorphic with respect to each other. Two solutions are isomorphic if they differ in terms of labeling, but not topology. For example, FIG. 4 shows a solution X 304 that includes four devices assigned the respective labels A, B, C, and D. Respective channels couple these components together in the manner illustrated. A solution Y 306 includes four devices assigned the respective labels 1, 2, 3, and 4. Respective channels couple these devices together in the manner illustrated. It can be seen that solution X 304 has the same basic topology as solution Y 306. The solutions differ only in the labels assigned to their respective devices, and hence are isomorphic with respect to each other.

In other words, the DSE system 202 is given an input set of devices as a pool of possible resources; it draws from this pool to find solutions that satisfy various constraints. It discovers solution X 304 by using devices A, B, C, and D, and it discovers solution Y 306 using devices 1, 2, 3, and 4. But solution X 304 is basically the same as solution Y 306, and can therefore be expected to offer the same performance and benefits. In actual practice, the DSE system 202 may be able to identify an enormous number of solutions, many of which differ in the unremarkable way shown in FIG. 4. To address this issue, the exploration module 208 provides various techniques to reduce (or eliminate) the number of non-diverse solutions. Section D elaborates on this aspect of its processing.

Figure 5:
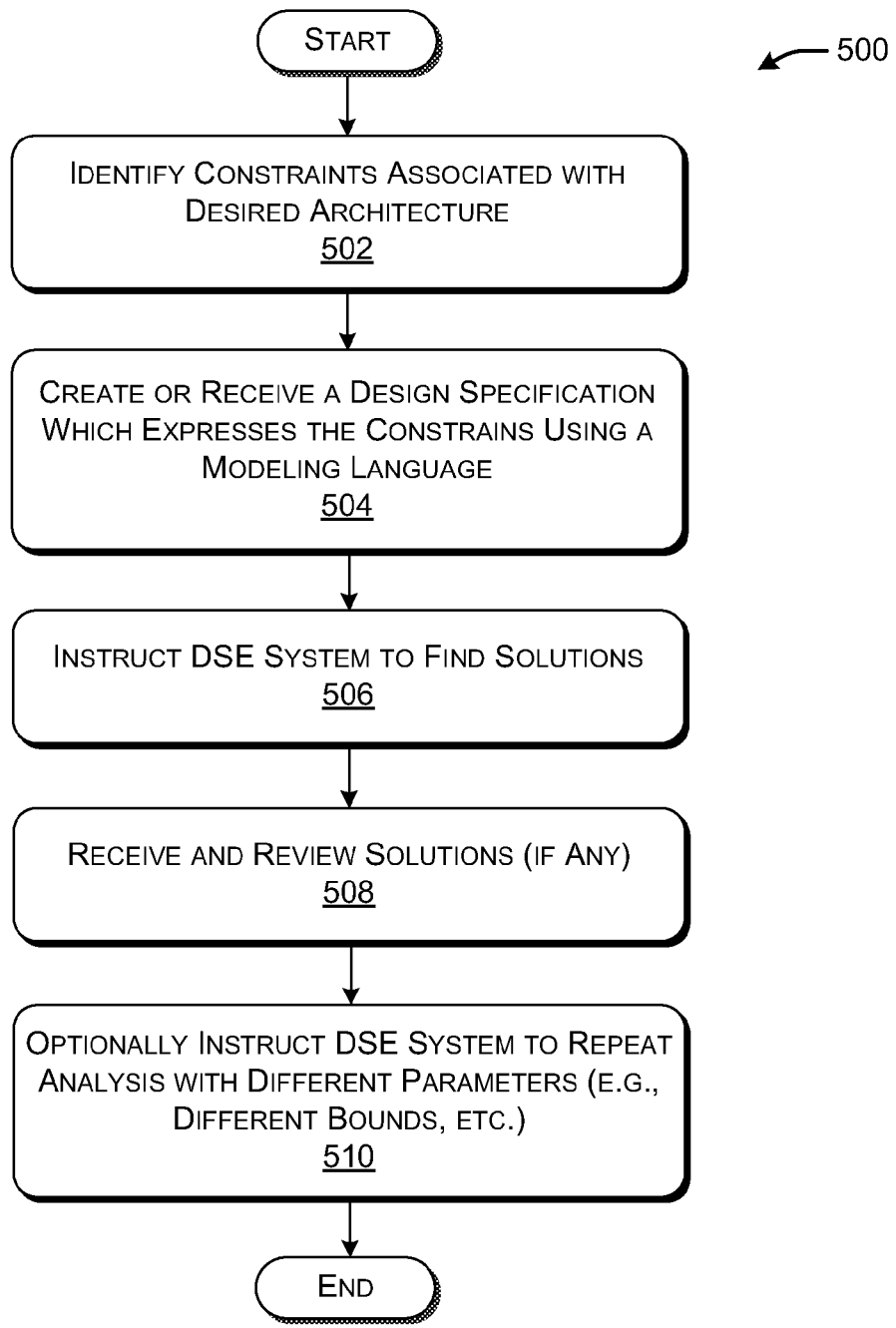
FIG. 5 is a flowchart that shows one manner of operation of the DSE system of FIG. 2, from the perspective of a user who operates the DSE system.

FIG. 5 summarizes the explanation above in flowchart form, from the perspective of a user who interacts with the DSE system 202. In block 502 of procedure 500, the user formulates the constraints that will define what constitutes an acceptable solution. For example, the user can apply his or her expertise in the relevant technical field to identify appropriate constraints. In block 504, the user interacts with the specification formulation module 204 to create a design specification which expresses the identified constraints in a modeling language. This operation is akin to writing a program; but the program here is a declarative logic-type program, rather than a conventional algorithm-based program. Alternatively, the user may receive a design specification that has already been produced by any source functionality.

In block 506, the user instructs the DSE system 202 to generate solutions for the design specification entered in block 504. In block 508, the user receives and reviews the diverse solutions identified by the DSE system 202. Note that the user is not asked to otherwise assist the exploration module 208 in identifying viable solutions. However, in block 510, the use may change one or more parameters and instruct the DSE system 202 to repeat its analysis. For example, assume that the DSE system 202 originally placed bounds on the maximum number of devices in the pool of available resources, e.g., by specifying the use of a maximum of ten devices. The DSE system 102 may identify that there is no solution that can be satisfied with only ten devices. In response, the user may opt to increase the maximum number of devices to twenty, and then repeat the analysis. The user can modify other bound-related parameters in a similar manner.

Figure 6:
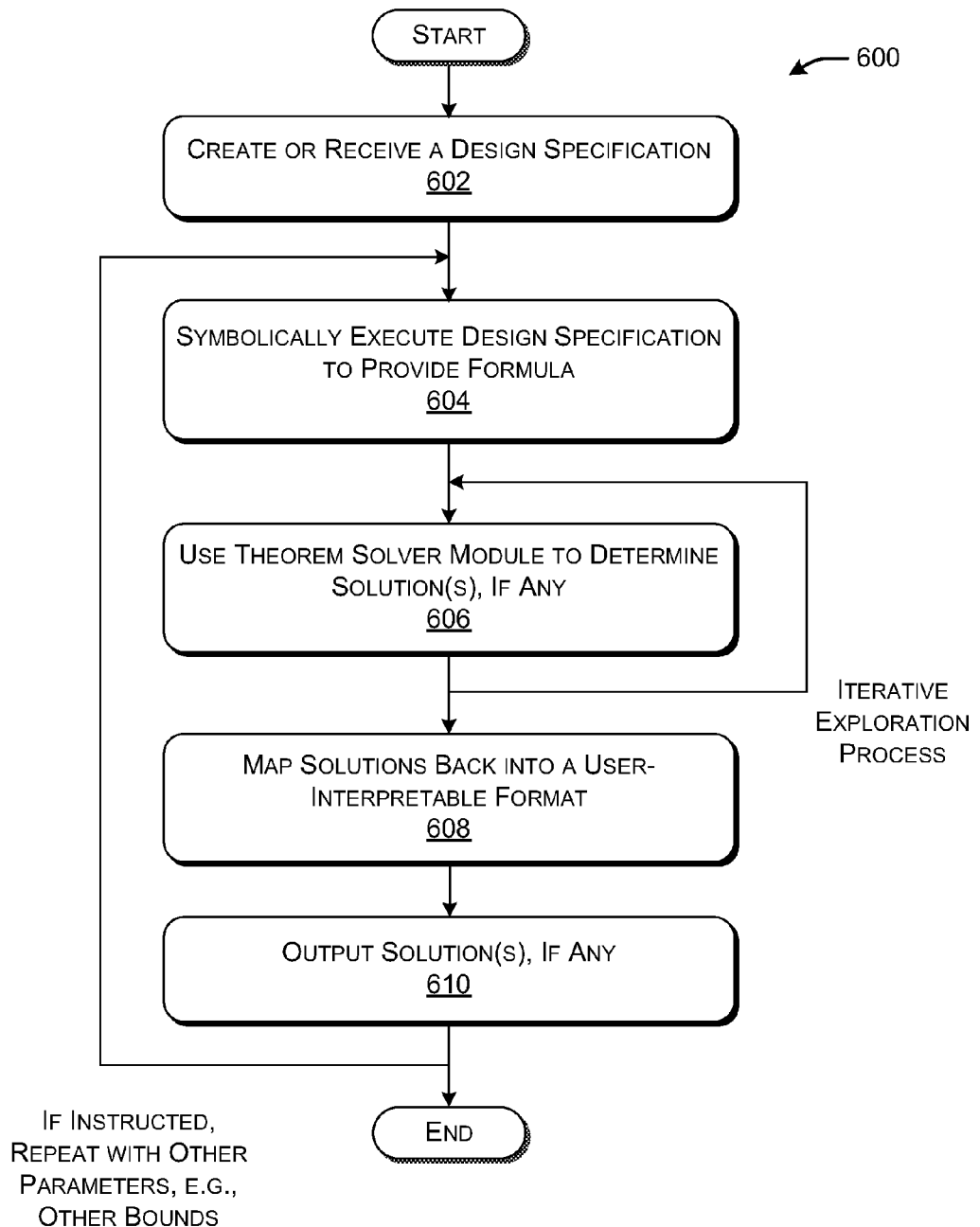
FIG. 6 is a flowchart that shows one manner of operation of the DSE system of FIG. 1, from the perspective of DSE system itself.

FIG. 6 shows the operation of the DSE system 202 in flowchart form, here from the "standpoint" of the DSE system 202 itself. In block 602 of procedure 600, the DSE system 202 creates the design specification in response to input from the user. Alternatively, the DSE system 202 can receive a design specification that has already been produced by any source functionality. In block 604, the DSE system 202 symbolically executes the design specification to provide a logical formula that can be interpreted by the theorem prover module 212. In block 606, the DSE system 202 uses the theorem prover module 212 to identify one or more diverse solutions to the constraints set forth in the design specification. In block 608, the DSE system 202 can map the solutions from the format of the theorem prover module 212 to a format that is interpretable by the user. For example, the DSE system 202 can convert the solutions into the format of the design specification (e.g., FORMULA), whereupon they can be displayed (in block 610) to the user as graphical models or textual records, etc.

The feedback loop complements the operation of block 510 of FIG. 5. The feedback loop indicates that the DSE system 202 can repeat the analysis of blocks 604-610 if the user changes one or more parameters that govern the operation of the DSE system 202, such as one or more bound-related parameters.

FIG. 6 also indicates that the exploration process in block 606 is an iterative process. In this process, the exploration module 208 repeatedly queries the theorem prover module 212 to obtain a solution (if a solution can be found). At each iteration, the exploration module 208 can exclude (or otherwise disfavor) solutions that it has already encountered. This prevents the DSE system 202 from returning solutions that are considered redundant. Again, Section D provides additional information regarding this exploration process.

Figure 7:
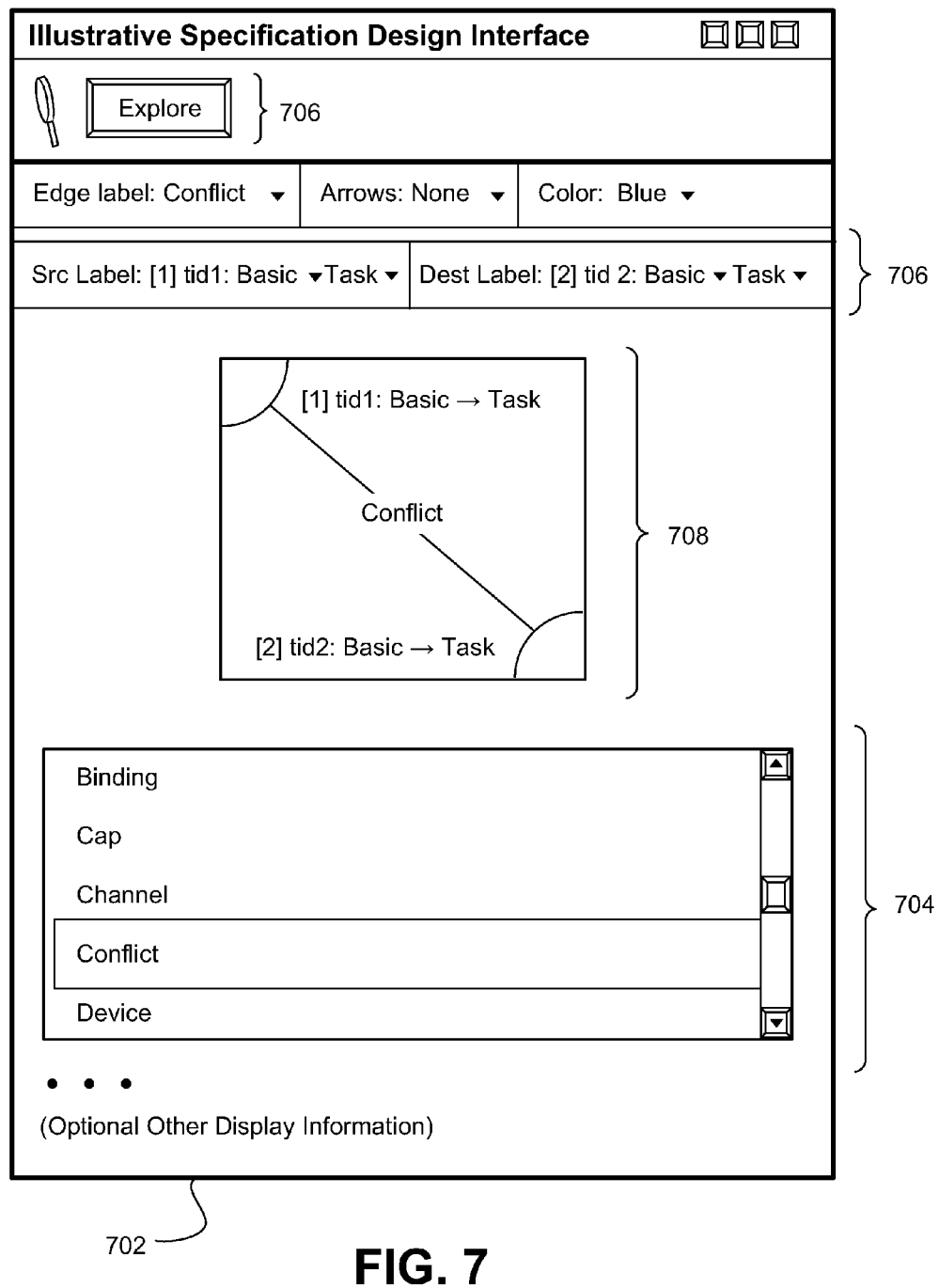
FIG. 7 shows one illustrative user interface presentation that can be provided by the DSE system of FIG. 2; this presentation assists the user in generating a design specification.

FIG. 7 shows one illustrative graphical user interface presentation 702 that a user can use to interact with the specification formulation module 204, e.g., to create or modify the design specification. In this merely illustrative case, the presentation 702 includes a section 704 that allows the user to select different data types pertaining to a design specification, e.g., in one merely illustrative case, "bindings" (representing bindings between devices and tasks), "caps" (representing capacities assigned to channels), "channels," "conflicts," and "devices." Each data type can be viewed as a record, a vertex-like object, or an edge-like object.

In the depicted example, the user has selected "conflict." The DSE system 202 responds by displaying a representative instance of this data type, e.g., a conflict between a task having id1 and a task having id2. The presentation 702 includes a section 706 which displays the conflict as a textual record, and a section 708 which displays the conflict in graphical form. Generally, the user can modify existing information through the presentation 700 or add new information.

Once the user has finished creating the design specification, he or she may click on an explore button 706. That action instructs the DSE system 102 to find one or more solutions to the design specification.

Figure 8:
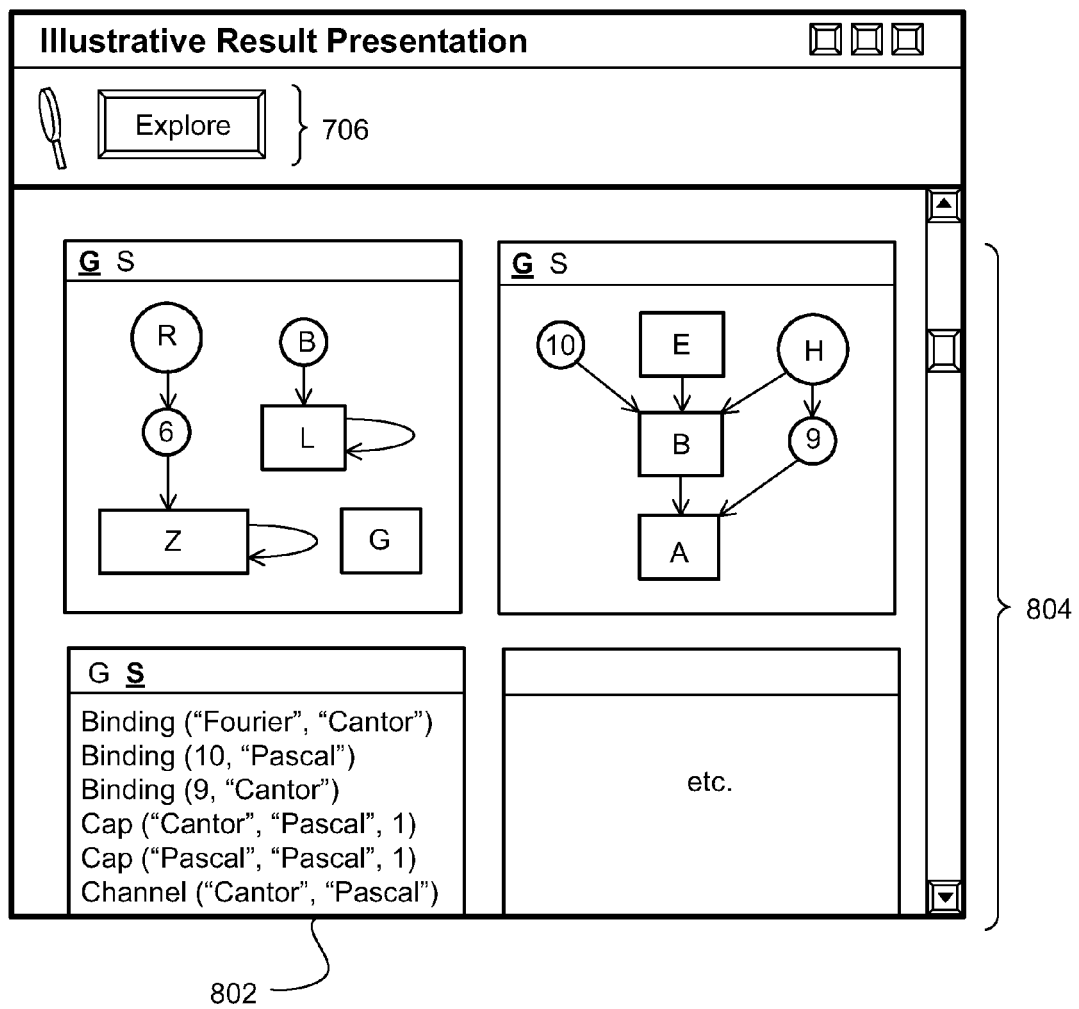
FIG. 8 shows another illustrative user interface presentation that can be provided by the DSE system of FIG. 2; this presentation displays a collection of solutions discovered by the DSE system.

FIG. 8 shows an illustrative graphical user interface presentation 802. The presentation 802 can display the solutions in any user-interpretable form, providing that at least one solution is found. For example, the presentation 802 can include a section 804 which presents each solution in a respective panel. Further, each respective panel can display the solution in different user-selectable formats. In one format, the DSE system 202 can express the solution in graphical form, e.g., as a collection of nodes connected via edges. In one case, the circles represent tasks and the boxes represent devices. The edges represent relations between these features. In another format, the DSE system 202 can express the solution in textual record form.

B. Generation of a Design Specification

This section provides additional information regarding the operation of the specification formulation module 204 of FIG. 2. As stated, the specification formulation module 204 allows a user to generate or receive a design specification expressed in a modeling language, such as FORMULA. The design specification encapsulates all the constraints associated with a design problem. More specifically, the design specification can express constraints using constraint logic programming (CLP).

To provide a concrete example, this section describes a portion of a design specification that is structured using the concepts set forth above, namely, devices, tasks, channels, capacities, etc. These concepts pertain to one particular design environment. A user may establish other structuring concepts (and associated data types) that may be more appropriate for other design environments.

Figures 9, 10:
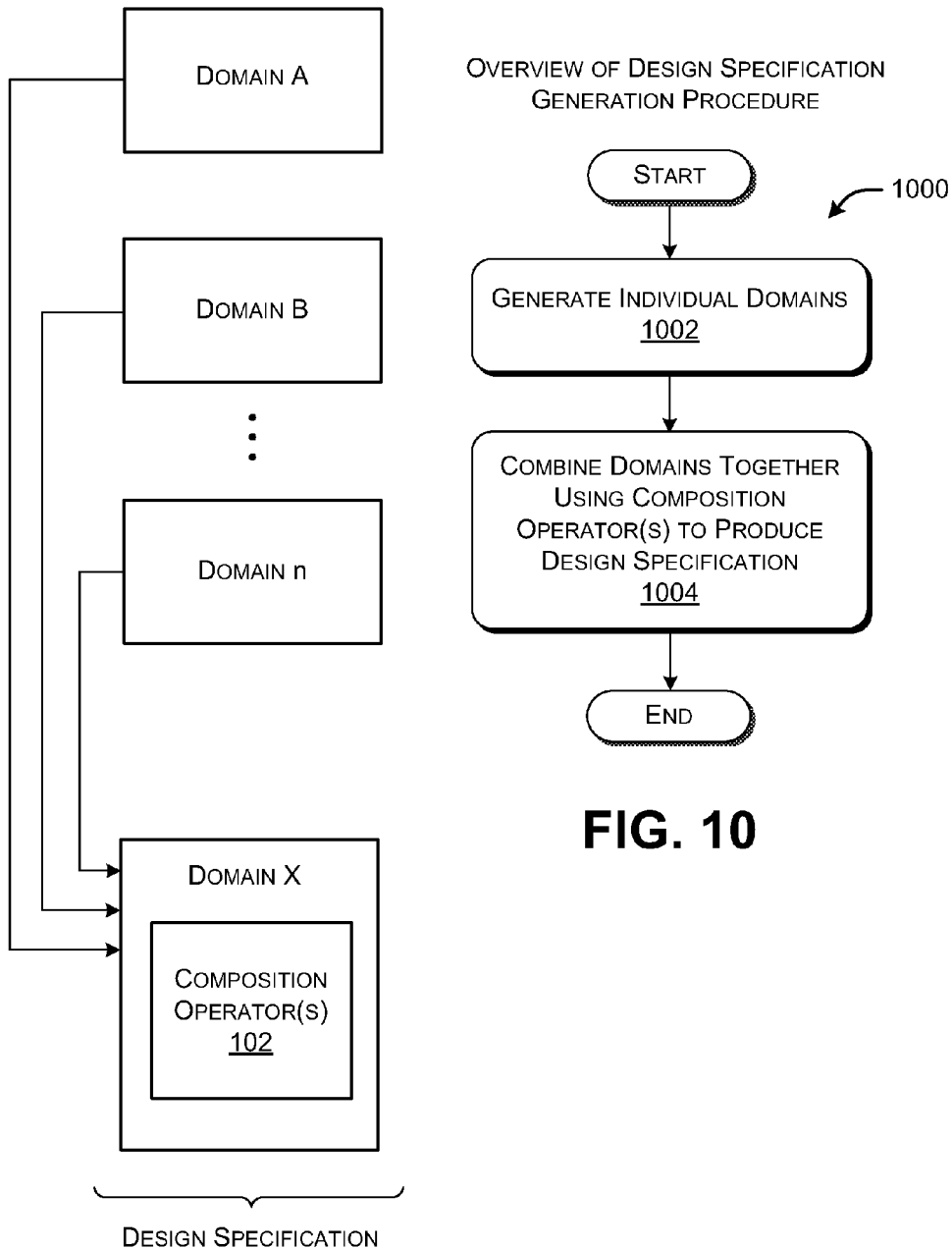
FIG. 9 shows one way in which a design specification module (of the DSE system of FIG. 2) can create a design specification from plural domains.
FIG. 10 is a flowchart that shows one procedure for creating a design specification.

FIG. 9 shows a high-level depiction of how the specification formation module 204 can construct a design specification. Namely, the user can generate two or more domains (A, B, . . . , n). Each domain pertains to a different aspect of a design problem, encapsulating the concepts appropriate to that aspect of the design problem. The user can then combine two or more domains together using different types of composition operators. (That is, different composition operators define different ways in which the information imparted by one domain affects the information imparted by another domain.) The resultant composite domain can encapsulate all of the constraints associated with a design problem. That resultant composite domain constitutes the design specification.

FIG. 10 summarizes the principles set forth above. In block 1002 of that procedure 1000, the user uses the specification formulation module 204 to generate separate domains. In block 1004, the user combines the domains together using one or more composition operators to yield a composite domain, which also constitutes the design specification.

Figure 11:
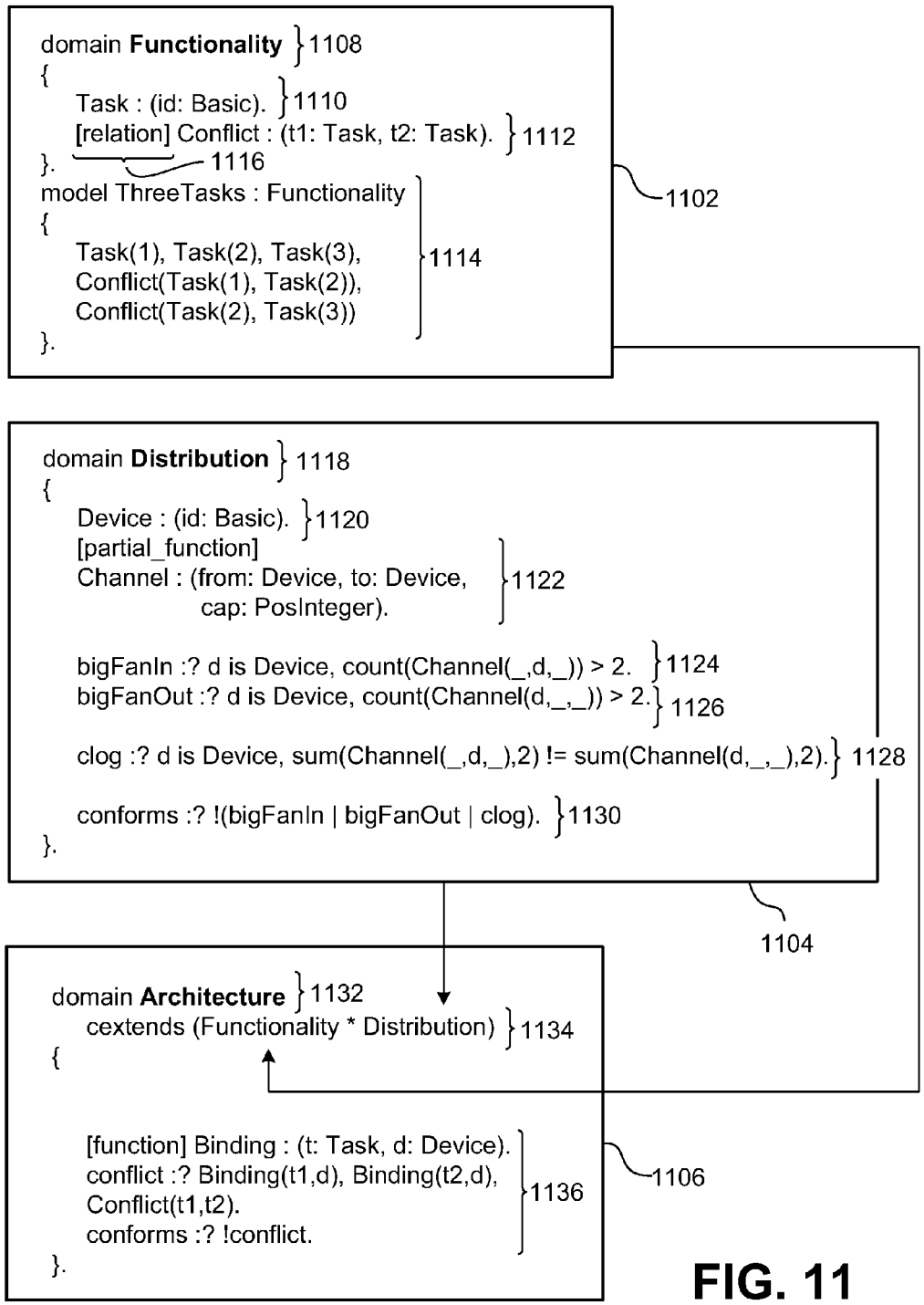
FIG. 11 shows an example of a collection of domains that can be combined together to create a design specification.

FIG. 11 provides one example of the principles summarized in FIGS. 9 and 10. In this example, the user has defined various domains (1102, 1104, and 1106) which are deemed appropriate to a particular design problem. And within each domain, the user has defined various data types and constraints that are pertinent to that domain. A data type corresponds to the name of a sort, a record constructor, or a (non-disjoint) union of other data types. FORMULA data types are algebraic: hence, two data instances are the same if and only if they were built from the same sequence of constructors and constants. This formalism captures inductive data types with type constraints. To emphasize, the domains and data types shown in FIG. 11 are user-defined, not fixed; thus, a user may adopt other domains and data items (not shown) that are deemed more appropriate for other design environments.

In the example of FIG. 1, the user has created a first domain 1102, identified as "Functionality," to express the functional attributes of a design problem. The user has created a second domain 1104, identified as "Distribution," to express the distribution-related attributes of a design problem. The user has created a third domain 1106, identified as "Architecture," to express the overall characteristics of the design problem. The third domain 1106 combines the features of the first domain 1102 and the second domain 1104 using a composition operator "*", to be described below.

Consider the first domain 1102. Portion 1108 identifies the name of the domain 1102 as "Functionality." Portion 1110 declares a constructor called "Task," which takes an id argument of type Basic. (The Basic type is the set of all constants.) Portion 1112 declares a constructor for denoting conflicts between tasks, which receives two arguments of type Task. Portion 1114 defines a model "ThreeTasks." A model corresponds to a set of record instances (also referred to as simply "records") built using the constructors of a domain that satisfy domain constraints (here, Task and Conflict). Each model sets forth an assertion regarding a desired architecture. When the design specification is evaluated, the execution engine will verify whether or not this claim is true.

Portion 1116 identifies a shorthand annotation ("relation") to expresses a common type of constraint. The "relation" constraint can be formally stated as follows. Let ⟦ C ⟧ be the set of all well-typed records that can be constructed by constructor C. If M is a set of records, then M(C)=M∩⟦ C ⟧ is the set of all C-records in M. For example, M(Task) and M(Conflict) is the set of all tasks/conflicts, respectively. The "relation" annotation in portion 1116 requires that every model M satisfies {(t1,t2)|Conflict(t1,t2)∈M(Conflict)} ⊂ M(Task)×M(Task). Other annotations can be assigned to other types of common constraints. Generally, the specification formulation module 204 has built-in support for such common constraints, eliminating the need for the user to specify the constraints in detail.

The second domain 1104 includes a portion 1118 that identifies the name of the domain, namely "Distribution." Portion 1120 declares the data type "Device," and portion 1122 declares the data type "Channel." A channel is specified by three pieces information: a source device, a destination device, and a capacity.

Portion 1124 identifies a "bigFanIn" query for checking if an input model M has a device with too many incoming channels (in this case, more than two channels). (The underscore "" represents a "don't care" variable.) Portion 1126 similarly identifies a "bigFanOut" query for checking if an input model M has a device with too many outgoing channels (in this case, more than two channels). When operating on the specification, an execution engine will seek to determine whether these queries evaluate to true for given input information. Portion 1128 identifies a "clog" query that sums the capacities on incoming and outgoing channels; it uses that information to determine whether the communication over these channels is unbalanced.

Portion 1130 provides a query called conforms. Every domain includes such a query. In some cases, a domain explicitly includes such a query; in other cases (such as in domain 1102), it is implied. By definition, an input model satisfies domain constraints if (and only if) the conforms query evaluates to true. In domain 1104, the conforms query states that bigFanIn, bigFanOut, and clog each never evaluate to true. Hence, the conforms query in this case is a way of consolidating constraints specified by individual queries within the domain. The conforms query in domain 1104 also contains implicitly-generated constraints due to a "partial function" annotation.

The third domain 1106 includes a portion 1132 that identifies the name of the domain, namely "Architecture." Portion 1134 specifies that the domain 1106 is an aggregate-type domain which combines the constraints of domains 1102 and 1104. The portion 1134 specifically uses a "*" composition operator, which means that the specifications of the domain 1102 ("Functionality") are combined with the specifications of the domain 1104 ("Distribution"). Other composition operators can carry out other operations with respect to the identified input domains. Portion 1136 also adds a new data structure "Binding" and specifies that Binding is requested to respect task conflicts.

The conforms statement of the third domain 1106 ("Architecture") incorporates the constraints imported from the other domains (1102 and 1104). Thus, the third domain 1106 has the effect of consolidating all of the constraints specified thus far into a master design specification.

C. Converting the Design Specification into a Formula

The symbolic execution module 206 receives the design specification from the specification formulation module 204. It then translates this design specification into a logical formula that can be processed by the theorem prover module 212. This section provides illustrative details regarding this operation.

By way of overview, the symbolic execution module 206 generates a first-order formula φ[X]. X denotes a vector of variables appearing in φ; these variables represent unknowns to be determined. The theorem prover module 212 operates on this formula to find a mapping of variables to values that satisfies the design constraints expressed in the formula, e.g., $\{x_1 \mapsto v_1, \ldots, x_n \mapsto v_n\}$. This satisfying instance corresponds to a solution. A reverse translation converts a satisfying instance into the format of the design specification.

More specifically, the symbolic execution module 206 accepts a set of symbolic records having variables where constants would otherwise be. It then applies the constraints of the design specification to this symbolic input to create the formula. For example, consider the following illustrative symbolic input:

$$S = \begin{Bmatrix} \text{Task}(x_1), \text{Task}(x_2), \text{Task}(x_3) \\ \text{Device}(x_4), \text{Device}(x_5) \\ \text{Conflict}(x_6, x_7), \text{Channel}(x_8, x_9, x_{10}) \\ \text{Binding}(x_{11}, x_{12}) \end{Bmatrix} \quad (1)$$

The symbolic execution module 206 operates on this input to produce cp by determining all possible ways that zero to three tasks, zero to two devices, etc. can satisfy the constraints of the design specification. The symbolic execution can involve symbolically executing the design specification over the set of symbolic inputs, emitting all possible branches of the logic program, to thereby produce a quantifier-free formula. The symbolic set used to produce φ is referred to as the generator set (G) of φ; in the example above, Expression (1) specifies the generator set G.

In one case, the user can specify bounds on the exploration process, for example, by specifying a maximum number of devices in a pool of available resources from which to select. Further, in some cases, the DSE system 202 can infer unspecified bounds based on the bounds that are explicitly specified. In other cases, the user leaves some bounds unspecified, and therefore open-ended. In one approach, the DSE system 102 can address this situation by incrementally increasing an unfixed bound. For example, the DSE system 102 can select a candidate starting bound, and then determine whether a solution exists, given that bound. If no solution exists, the DSE can increase the bound and investigate whether there is now a solution. This procedure can be repeated until an acceptable solution is found.

D. Exploring the Design Space

Figure 12:
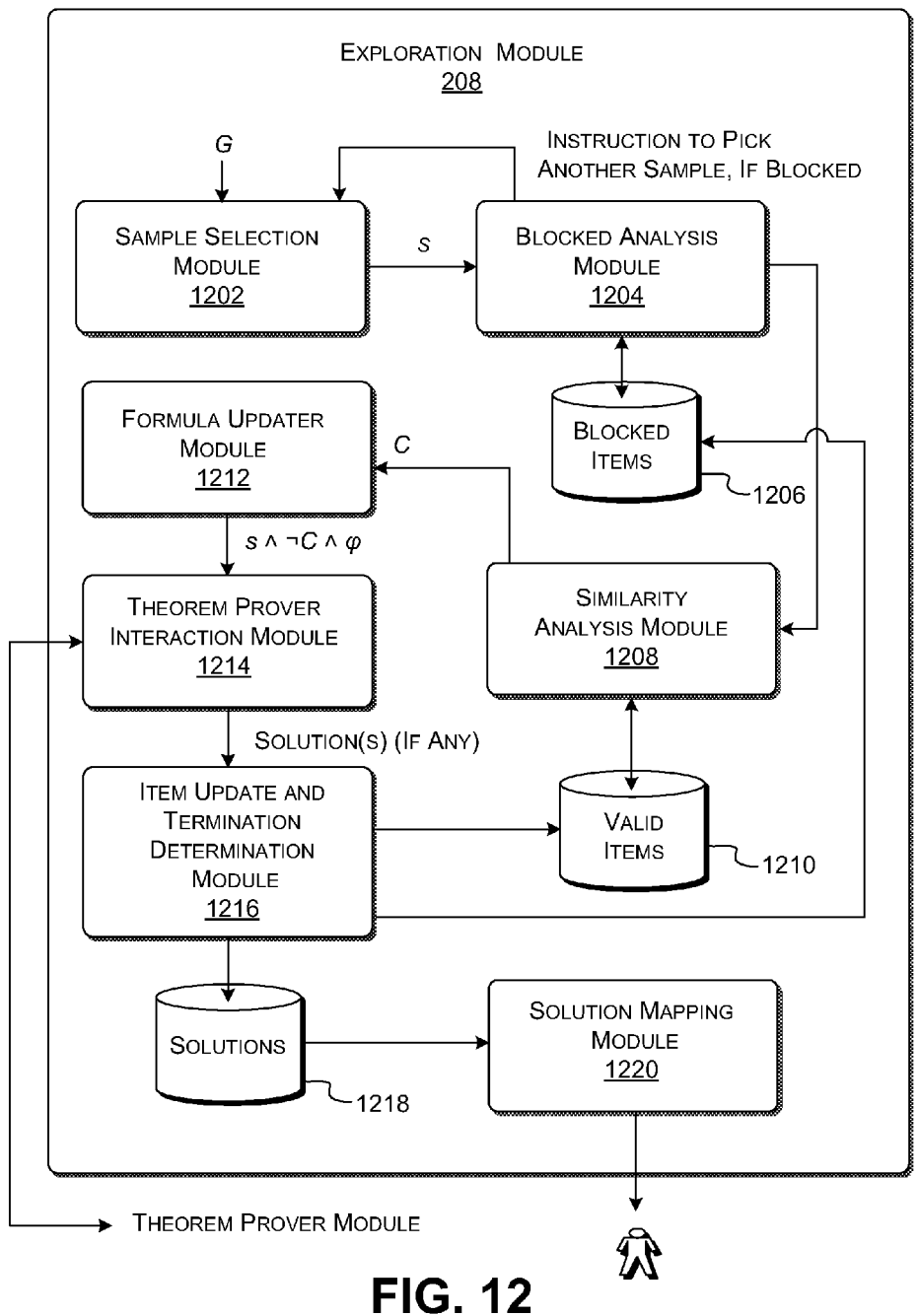
FIG. 12 shows an illustrative exploration module that can be used in the DSE system of FIG. 2; the exploration module identifies viable solutions within a design space.

FIG. 12 provides an overview of one implementation of the exploration module 208. To summarize, the exploration module 208 receives the formula cp from the symbolic execution module 206. It then interacts with the theorem prover module 212 to discover one or more diverse solutions to the constraints encoded in the formula. It does this by repeatedly sending a sample, together with the formula, to the theorem prover module 212. At each iteration, the theorem prover module 212 returns a solution (if a solution is available), excluding or otherwise disfavoring solutions that have already been encountered. There are many ways to implement the above principles. FIG. 12 shows one such way.

A sample selection module 1202 generates a sample s. In one case, assume that the generator set (G) is represented by the symbolic input of Equation (1). The sample selection module 1202 can generate a random selection from within that generator set. This can be implemented by randomly equating any two variables in the generator set. This has the effect of "folding up" the sample, removing one of its degrees of freedom. This "folding up" operation directs the exploration module 208 to different diverse locations within the design space; this is because this type of change affects the topology of the solution, not merely the labeling of its nodes. The sample s thus produced can encompass multiple equivalence classes.

A blocked analysis module 1204 receives the sample (s) and determines whether it is an appropriate input. It performs this task by performing a similarity test on the sample with respect a collection of blocked items in a store 1206. More specifically, the blocked analysis module 1204 can determine whether the sample is a homomorphic image of any item in the collection of blocked items. If so, the blocked analysis module 1204 rejects the sample, asking the sample selection module 1202 to generate another sample. In part, by rejecting a blocked sample, the blocked analysis module 1204 can prevent the exploration module 208 from investigating a sample that cannot satisfy design constraints (as assessed based on previous iterations of the exploration module 208).

Figure 16:
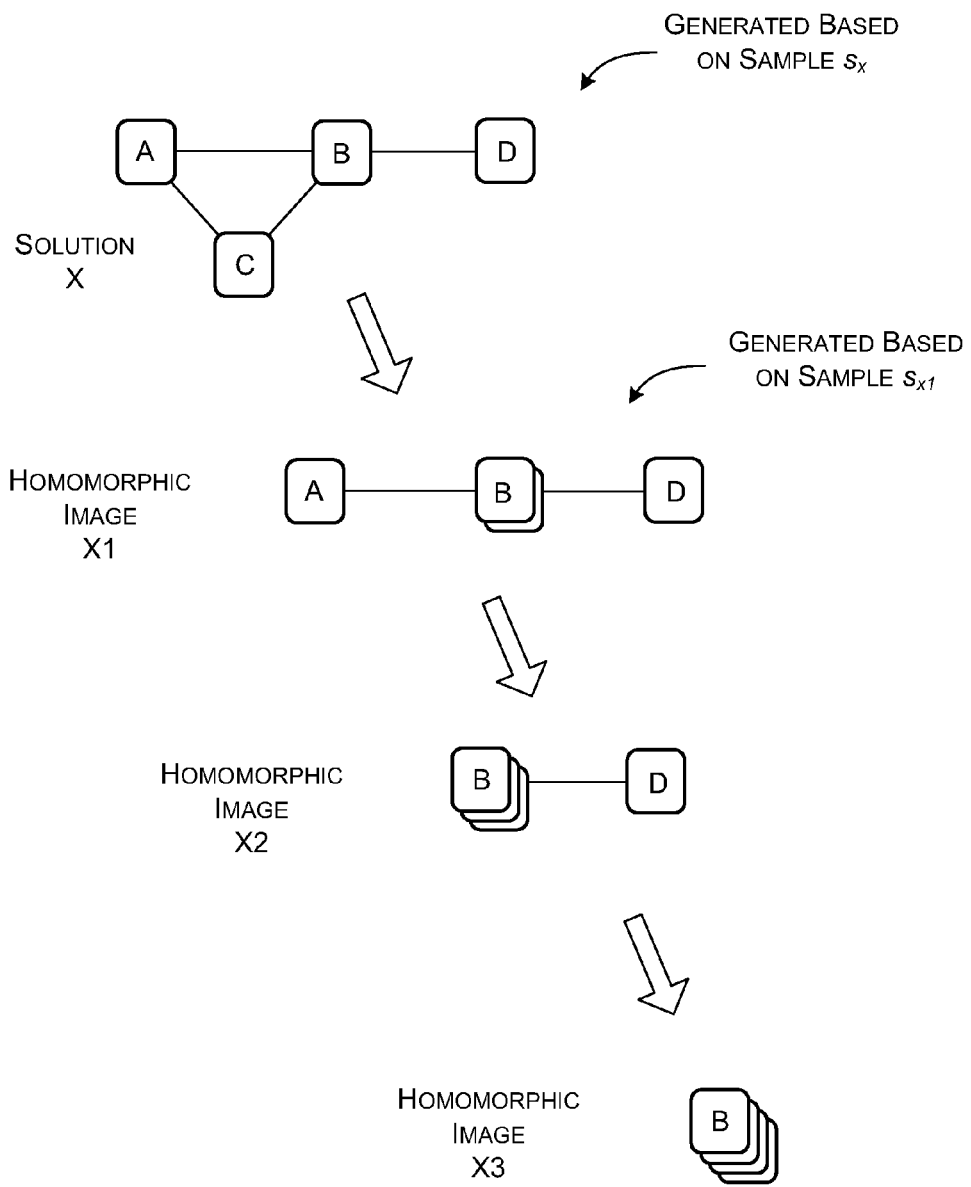
FIG. 16 is a graphical illustration of the concept of homomorphism, as applied to the processing performed in FIGS. 14 and 15.

FIG. 16 illustrates the concept of homographic images. Assume that a sample $s_x$ having four degrees of freedom yields the solution X. The solution X includes nodes A, B, C, and D. Assume next that two degrees of freedom in the sample $s_x$ are collapsed to produce a single degree of freedom. This is achieved by equating two variables in the sample $s_x$, to yield a modified sample $s_{x1}$. Assume that sample $s_{x1}$ yields the solution X1, having nodes A, B, and D. This "folding up" operation can be repeated, as shown in FIG. 1. Generally, it can be said that the complete range of solutions offered by sample $s_{x1}$ is also offered by sample $s_x$. Now assume that, based on a prior investigation, it has been determined that sample $s_x$ cannot provide any viable solution. This also means that sample $s_{x1}$ cannot provide any viable solution, since its range of solutions is subsumed by $s_x$'s range of solutions. In the context of FIG. 12, assume that the blocked analysis module 1204 determines that the sample s is a homomorphic image of an item in the collection of blocked items. If so, this means that the sample s cannot provide a viable solution and it is rejected.

Assume that the blocked analysis module 1204 concludes that the sample s is not precluded by an entry in the collection of blocked items. If so, a similarity assessment module 1208 determines whether the sample is a non-diverse counterpart of any solution that has been previously encountered (in a prior iteration). The similarity assessment module 1208 performs this task by processing the sample s with respect to a plurality of items in a collection of valid items, provided in data store 1210. More specifically, the similarity assessment module 1208 determines whether the sample s can be mapped into any item q in the collection of valid items based on the concept of homomorphism described above.

For example, assume that solution X1 shown in FIG. 16 has already been encountered as a valid solution. This solution is a member of an equivalency class that covers the basic three-node topology shown in FIG. 16. Assume next that the similarity analysis module 1208 is currently considering a sample that encompasses solutions in many equivalence classes, including, but not limited to, the equivalency class associated with solution X1. By collapsing certain degrees of freedom (associated with variables in the sample s), the sample s can made to yield solutions within the equivalency class associated with solution X1.

The exploration module 208 aims to prevent its investigation from discovering a solution that is an isomorphic counterpart to a solution that has already been encountered. Hence, the exploration module 208 identifies all the ways in which the sample can be folded up to produce a previously encountered equivalency class. The exploration module 208 records these transformations in a similarity set C.

At this juncture, a formula updater module 1212 can prepare a query to submit to the theorem prover module 212. That query asks the theorem prover module 212 to find a solution (soln) which satisfies the constraints in formula $\phi$, given the symbolic input s, but excluding the items in the similarity set C. The negation of the disjunction of the constraints in C prevents the theorem prover module 212 from equating variables in s in a way that would map s into one of the equivalence classes in the collection of valid items. A theorem prover interaction module 1214 submits the query to the theorem prover module 212 and receives any solution identified by the theorem prover module 212.

If a solution is found, an item update and termination determination module ("update module" for brevity) 1216 adds the solution to a collection of solutions (stored in data store 1218). Further, the update module 216 adds the solution to the collection of valid items. More formally stated, the update module 1216 derives a set of equalities between variables in s from soln, and uses them to reduce s into a canonical representation of the equivalence class that contains soln.

If a solution is not found, the update module 1216 adds the failed sample to the collection of blocked items. More specifically, the unsatisfiability of $S \wedge \neg C$ implies that any homomorphic images of s besides those in C cannot satisfy the design constraints. Hence, the exploration module 208 can safely reject any subsequent sample that is a homomorphic image of s, because every such image will either be unsatisfiable, or isomorphic to an element in the collection of valid items. This knowledge can cause an exponentially large region of the design space to be avoided, but still allows random sampling over the good regions of the space.

For a failed sample, the item update module 1216 also determines whether a termination condition has been reached in the exploration process. A termination condition is reached when the sample under consideration is the most general sample possible, yet yields no solution. A sample is considered the most general when it has all the degrees of freedom identified by the generator set. That is, the most general sample can be homomorphically mapped into any of the equivalence classes in the design space. Hence, if it becomes unsatisfiable, then no more solutions exist and the exploration process can terminate its exploration process.

Finally, a solution mapping module 1220 maps any solutions identified by the exploration module 208 from the logical domain of the theorem prover module 212 to a user-interpretable format. For example, the solution mapping module 1220 can convert the solutions to the format of the modeling language and then present these solutions to the user via the graphical user interface presentation 800 shown in FIG. 8.

Figure 13:
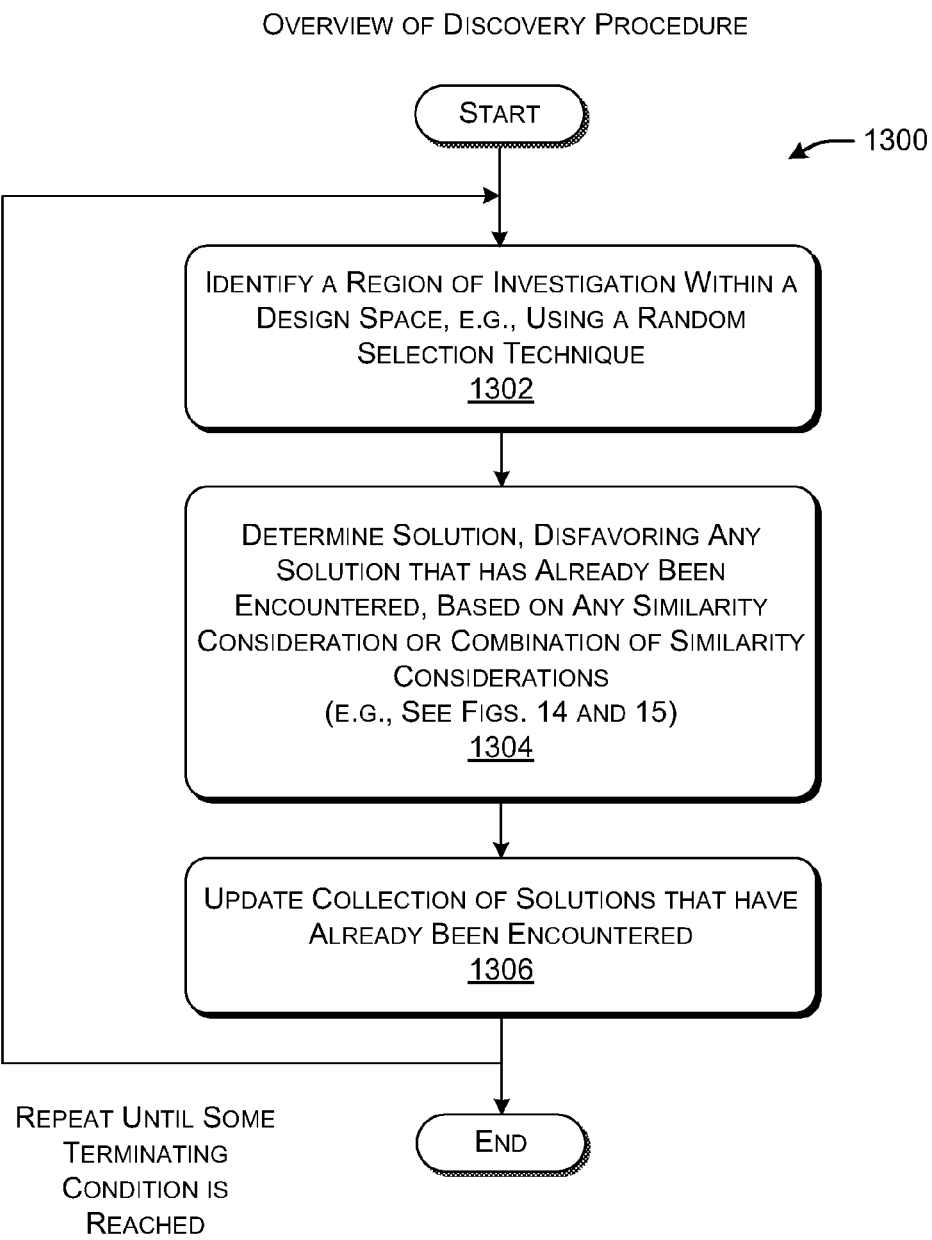
FIG. 13 is a flowchart that provides an overview of one manner of operation of the exploration module of FIG. 12.
Figure 14:
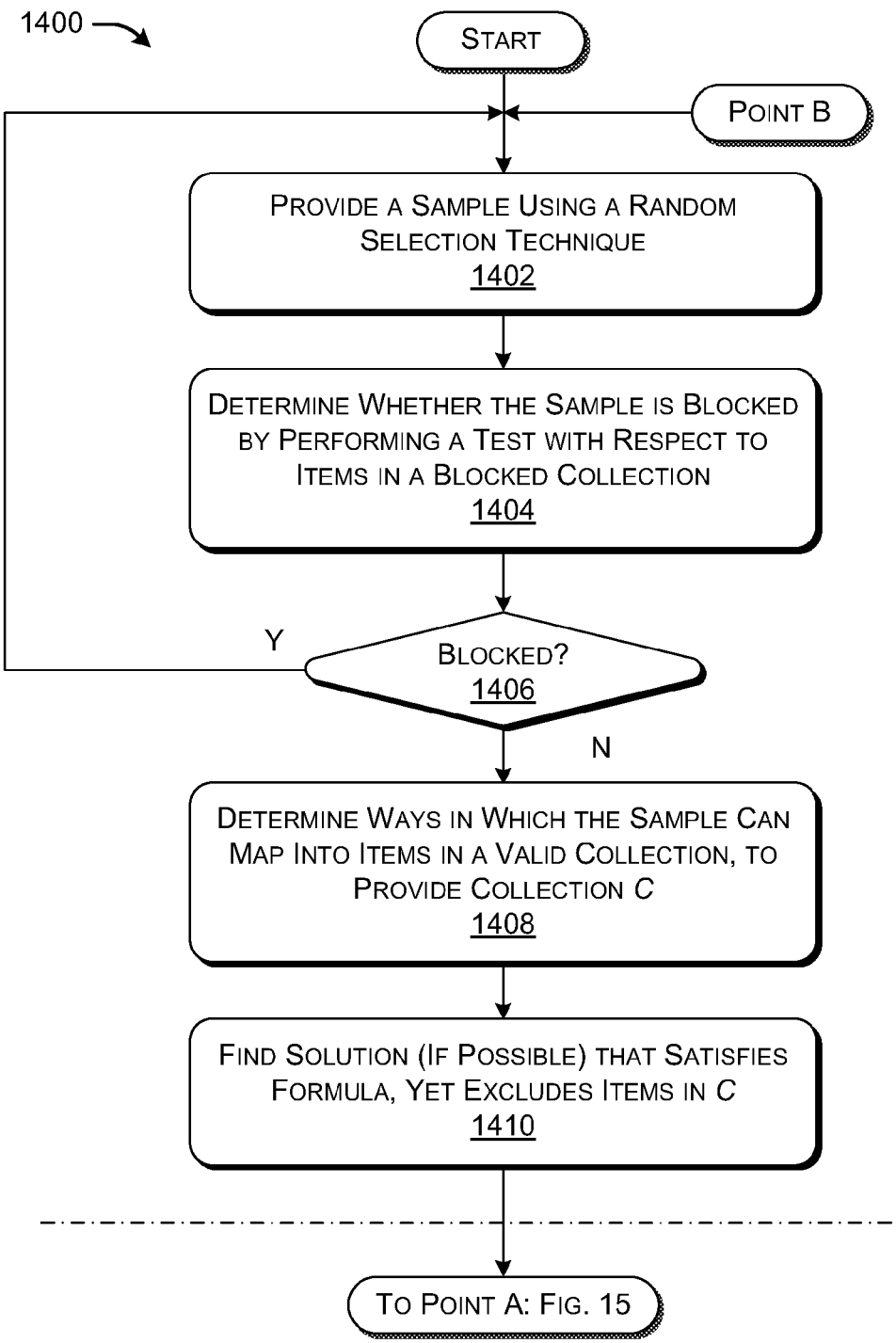
FIGS. 14 and 15 together describe a more specific manner of operation of the exploration module of FIG. 12, according to one illustrative implementation.
Figure 15:
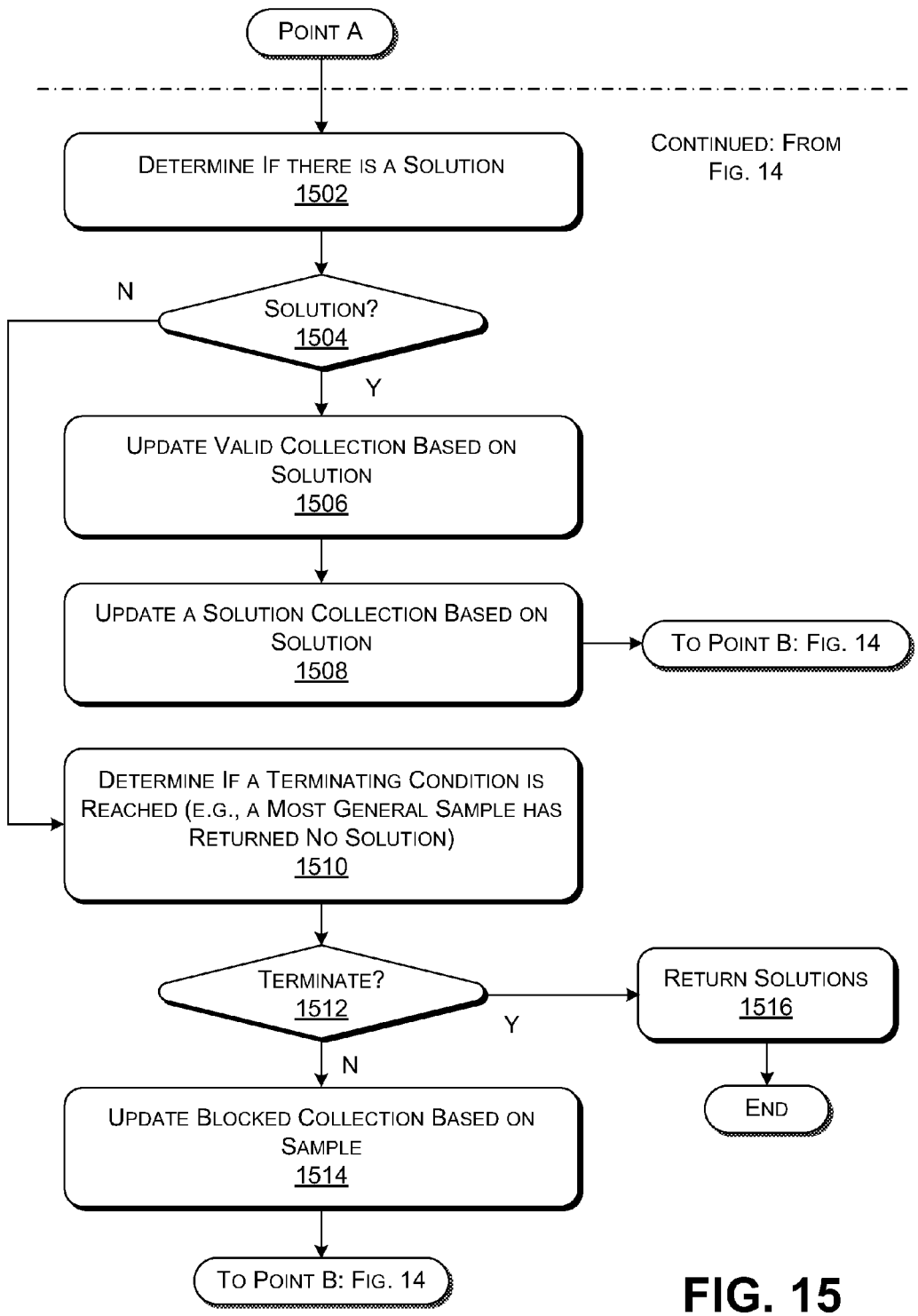

FIGS. 13-15 summarize the concepts set forth above in flowchart form. To begin with, FIG. 13 shows a procedure 1300 which represents an overview of one manner of operation of the exploration module 208. This procedure 1300 encompasses the operations described above, as well as other implementations.

In block 1302, the exploration module 208 identifies a region for investigation within a design space. This operation may correspond to selecting a sample s based on a random selection technique. In the approach of FIG. 12, the region of investigation defined by the sample s encompasses multiple equivalence classes.

In block 1304, the exploration module 208 determines a solution within the region defined by the sample s. In finding this solution, the exploration module 208 disfavors any solution that has already been encountered. In the context of FIG. 12, the exploration module 208 performs this task by finding the similarity set C and sending the negation of this set to the theorem prover module 212.

In block 1306, the exploration module 208 receives a solution which satisfies the formula (yet excludes previously encountered solutions), providing that one such solution exists. The exploration module 208 adds this solution to its list of solutions that have previously been encountered.

FIGS. 14 and 15 together depict a procedure 1400 that represents one version of the general procedure 1300 of FIG. 13. This procedure 1400 tracks the description of the exploration module 208 with respect to FIG. 12, and thus will be described in summary fashion below.

In block 1402, the exploration module 208 selects a random sample s using a random selection technique. In block 1404, the exploration module 208 determines whether the sample is contained within a collection of blocked items. If it is determined, in block 1406, that the sample is blocked, then the exploration module 208 repeats the operations of blocks 1402 and 1404 until it finds a non-blocked sample.

In block 1408, assuming that the sample is not blocked, the exploration module 208 determines ways in which the sample can be mapped into items in the collection of valid items, to thereby form a similarity set C. The exploration module 208 provides this result by performing homomorphism analysis in the manner described above. In block 1410, the exploration module 208 directs the theorem prover module 212 to find a solution that satisfies the formula $\phi$ and sample s, yet excludes items in the similarity set C.

Advancing to FIG. 15, in blocks 1502 and 1504, the exploration module 208 determines if a solution has been found. If so, in block 1506, the exploration module 208 updates the collection of valid items. In block 1508, the exploration module updates the collection of solutions. The procedure flow then returns to block 1402, where another sample is selected and analyzed in the manner described above.

If a solution is not found, in blocks 1510 and 1512, the exploration module 208 determines whether a termination condition has been reached (e.g., whether a most general sample has failed to provide at least one solution). If not, in block 1514, the exploration module 308 updates the collection of blocked items based on the failed samples and returns to block 1402 of FIG. 14. If the termination condition has been reached, in block 1516, the exploration module returns the solutions to the user, after converting them to a user-interpretable format.

In the above explanation, the exploration module 208 operates to outright exclude solutions that represent isomorphic counterparts of solutions that have already been encountered. In other implementations, the exploration module 208 can relax this rule, such that it generally disfavors redundant solutions (and therefore reduces the number of redundant solutions), but may not outright exclude them. In one alternative, the exploration module 208 can, instead of testing for homomorphisms, use an algebraic technique to calculate the automorphism group of a colored graph; the exploration module 208 can then use that automorphism group to modulate the sampling procedure.

E. Representative Processing Functionality

FIG. 17 sets forth illustrative electrical data processing functionality 1700 that can be used to implement any aspect of the functions described above. With reference to FIG. 2, for instance, the type of processing functionality 1700 shown in FIG. 17 can be used to implement any aspect of the DSE system 202. In one case, the processing functionality 1700 may correspond to any type of computing device that includes one or more processing devices.

The processing functionality 1700 can include volatile and non-volatile memory, such as RAM 1702 and ROM 1704, as well as one or more processing devices 1706. The processing functionality 1700 also optionally includes various media devices 1708, such as a hard disk module, an optical disk module, and so forth. The processing functionality 1700 can perform various operations identified above when the processing device(s) 1706 executes instructions that are maintained by memory (e.g., RAM 1702, ROM 1704, and/or elsewhere). More generally, instructions and other information can be stored on any computer readable medium 1710, including, but not limited to, static memory storage devices, magnetic storage devices, optical storage devices, and so on. The term computer readable medium also encompasses plural storage devices.

The processing functionality 1700 also includes an input/output module 1712 for receiving various inputs from a user (via input modules 1714), and for providing various outputs to the user (via output modules). One particular output mechanism may include a presentation module 1716 and an associated graphical user interface (GUI) 1718. The processing functionality 1700 can also include one or more network interfaces 1720 for exchanging data with other devices via one or more communication conduits 1722. One or more communication buses 1724 communicatively couple the above-described components together.

In closing, the description may have described various concepts in the context of illustrative challenges or problems. This manner of explication does not constitute an admission that others have appreciated and/or articulated the challenges or problems in the manner specified herein.

Further, the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for exploring a design space, the method comprising:
receiving a design specification expressed in a modeling language, the design specification describing a collection of constraints that acceptable architectures are expected to satisfy;
symbolically executing the design specification to provide a logical formula, wherein said symbolically executing comprises executing the design specification over a set of symbolic inputs to produce the logical formula and wherein the logical formula is quantifier-free;
in an instance when at least two solutions to the logical formula exist, interacting with a theorem prover module to identify a first solution to the logical formula and a second solution to the logical formula within the design space, wherein:
the first solution pertains to a first architecture that satisfies the constraints, and
the second solution pertains to a second architecture that also satisfies the constraints and is different than the first architecture; and
converting the first solution and the second solution into a user-interpretable form,
wherein at least the interacting with the theorem prover module is performed by a processing device.

2. The computer-implemented method of claim 1, wherein:
the first architecture corresponds to a first software architecture that carries out a plurality of tasks using a plurality of devices, the plurality of devices being coupled together using a plurality of channels,
the second architecture corresponds to a second software architecture that also carries out the plurality of tasks using the plurality of devices,
wherein the collection of constraints operate to constrain different aspects of the first software architecture and the second software architecture.

3. The computer-implemented method of claim 1, wherein the modeling language specifies the constraints using constraint logic programming.

4. The computer-implemented method of claim 1, wherein the design specification is composed of a plurality of domains, wherein each domain refers to a different aspect of a design problem.

5. The computer-implemented method of claim 1, wherein the logical formula comprises a vector of variables, the first solution comprises a first mapping of the variables to first values that satisfy the constraints, and the second solution comprises a second mapping of the variables to other values that also satisfy the constraints.

6. The computer-implemented method of claim 1, wherein said interacting comprises iteratively performing operations of:
identifying a region of investigation within the design space based on a random selection technique; and
in the instance when the at least two solutions to the logical formula exist, using the theorem prover module to identify the first solution and the second solution to the logical formula within the region of the design space.

7. The computer-implemented method of claim 1, wherein said interacting comprises disfavoring a third solution that is deemed similar to the first solution as assessed based on at least one similarity consideration.

8. The computer-implemented method of claim 7, wherein the at least one similarity consideration corresponds to an isomorphism assessment, wherein the first solution and the disfavored third solution are deemed isomorphic counterparts when they differ in labels applied thereto, but do not differ in topology.

9. The computer-implemented method of claim 1, wherein said interacting comprises:
providing a sample to the theorem prover module, the sample being determined using a random selection technique;
determining whether the sample is blocked by determining whether the sample is included in a collection of blocked items; and
when the sample is blocked, providing another sample to the theorem prover module and repeating said determining.

10. The computer-implemented method of claim 9, wherein the sample is drawn from a generator set, and wherein said random selection technique comprises randomly selecting two variables within the generator set and equating the randomly selected two variables to yield the sample.

11. The computer-implemented method of claim 9, wherein said interacting further comprises:
when the sample is not blocked, determining a similarity set that identifies ways, if any, in which the sample can be mapped into any valid item in a collection of valid items; and
using the theorem prover module to identify the first solution, excluding at least one other solution that is associated with any item in the similarity set.

12. The computer-implemented method of claim 11, wherein each item in the similarity set corresponds to a homomorphic image of the sample, associated with a corresponding valid item in the collection of valid items.

13. The computer-implemented method of claim 11, wherein said interacting further comprises:
updating the collection of valid items when the first solution is found; and
updating a collection of solutions by adding the first solution to the collection of solutions.

14. The computer-implemented method of claim 11, wherein said interacting further comprises updating a collection of blocked samples based on the sample, when no solution is found for the sample.

15. The computer-implemented method of claim 11, wherein said interacting further comprises:
in a different instance, determining that a termination condition has been reached when a most general sample fails to yield an acceptable solution.

16. A design space exploration system for exploring a design space, the design space exploration system comprising:
a specification formulation module configured to generate or receive a design specification expressed in a modeling language, the design specification describing a collection of constraints that an acceptable software architecture is expected to satisfy;
a symbolic execution module configured to symbolically execute the design specification to provide a logical formula;
an exploration module configured to:
interact with a theorem prover module to identify, in an instance when at least two solutions to the logical formula exist, a first solution to the logical formula and a second solution to the logical formula within the design space, wherein:
the first solution pertains to a first software architecture that satisfies the constraints, and
the second solution pertains to a second software architecture that also satisfies the constraints and is different than the first software architecture; and
after the first solution has been encountered, disfavor a third solution that is deemed similar to the first solution based on at least one similarity consideration, wherein the at least one similarity consideration relates to an isomorphism assessment indicating that the first solution and the disfavored third solution are isomorphic counterparts differing in labeling but not topology; and
at least one processing device configured to execute at least the exploration module.

17. One or more computer readable volatile or non-volatile memory devices or non-volatile storage devices storing computer readable instructions, the computer readable instructions providing a design space exploration system when executed by one or more processing devices, the computer readable instructions comprising:
logic configured to:
identify a first region of investigation within a design space;
identify a second region of investigation within the design space, the second region being different than the first region;
use a theorem prover module to identify:
a first solution to a logical formula in an instance when the first solution exists within the first region of the design space, and
a second solution to the logical formula in an instance when the second solution exists within the second region of the design space; and
disqualify a third region of investigation based on a determination that the third region of investigation yields no solutions to the logical formula,
the logical formula being derived from a design specification expressed in a modeling language, and
the first solution and the second solution pertaining to different architectures that satisfy a collection of constraints.

18. The one or more computer readable volatile or non-volatile memory devices or non-volatile storage devices of claim 17, wherein said logic is configured to identify the first region and the second region using a random selection technique.

19. The one or more computer readable volatile or non-volatile memory devices or volatile storage devices of claim 17, wherein the third region of investigation encompasses multiple equivalence classes.

20. The one or more computer readable volatile or non-volatile memory devices or non-volatile storage devices of claim 17, wherein said logic is operative to disfavor any solution that is deemed similar to the first solution when the first solution has previously been encountered, as assessed based on at least one similarity consideration.

\* \* \* \* \*